United States Patent
Saigusa

(10) Patent No.: US 10,558,405 B2
(45) Date of Patent: Feb. 11, 2020

(54) INFORMATION PROCESSING APPARATUS AND DRIVER CUSTOMIZING METHOD

(71) Applicant: CANON KABUSHIKI KAISHA, Tokyo (JP)

(72) Inventor: Hirokazu Saigusa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/008,387

(22) Filed: Jun. 14, 2018

(65) Prior Publication Data

US 2018/0373468 A1 Dec. 27, 2018

(30) Foreign Application Priority Data

Jun. 23, 2017 (JP) .................... 2017-123567

(51) Int. Cl.
*G06F 3/12* (2006.01)

(52) U.S. Cl.
CPC ............ *G06F 3/123* (2013.01); *G06F 3/1207* (2013.01); *G06F 3/1228* (2013.01); *G06F 3/1259* (2013.01); *G06F 3/1289* (2013.01)

(58) Field of Classification Search
CPC .............................. G06F 3/123; G06F 3/1207
See application file for complete search history.

(56) References Cited

U.S. PATENT DOCUMENTS

| 6,378,128 B1* | 4/2002 | Edelstein | G06F 8/61 709/221 |
|---|---|---|---|
| 7,966,599 B1* | 6/2011 | Malasky | G06F 9/455 717/100 |
| 2002/0041396 A1* | 4/2002 | Ugajin | G11B 20/1883 358/1.17 |
| 2005/0243356 A1* | 11/2005 | Hibi | G06F 3/1204 358/1.13 |
| 2006/0221370 A1* | 10/2006 | Iida | G06F 9/4411 358/1.13 |
| 2009/0310171 A1* | 12/2009 | Onoda | G06F 3/1205 358/1.15 |

FOREIGN PATENT DOCUMENTS

JP 2006-209195 8/2006

* cited by examiner

*Primary Examiner* — Ibrahim Siddo
(74) *Attorney, Agent, or Firm* — Venable LLP

(57) ABSTRACT

When customizing print settings data, a customization tool provides a function for changing factory default values through a UI. The changes added to the default print settings are then saved as customized default print settings.

18 Claims, 34 Drawing Sheets

FIG. 6A

DRIVER CUSTOMIZATION TOOL — 6000, 6001

ADVANCED CUSTOMIZATION SETTINGS

| PRINTER NAME | PRINT SETTINGS | FAVORITES | STAMPS | DEVICE/ ADMINISTRATOR |
|---|---|---|---|---|
| MFP 1000 | -- | -- | -- | -- |
| MFP 2000 | -- | -- | -- | -- |
| MFP 3000 | -- | -- | -- | -- |
| MFP 5000 | -- | -- | -- | -- |
| SFP 1000 | -- | -- | YES | -- |
| SFP 2000 | -- | -- | -- | -- |
| SFP 5000 | -- | -- | -- | -- |
| SFP 6000 | -- | -- | YES | -- |

6002 — [SETTINGS] [CLEAR]
6003 — [NEXT] [CANCEL]

FIG. 6B

DRIVER CUSTOMIZATION TOOL — 6100, 6101

CREATE CUSTOM DRIVER SET

OUTPUT DESTINATION:
6102 — [                    ]  [BROWSE...]

CUSTOM CODE:
6103 — [           000001]

6107 — [CREATE] [CANCEL]

FIG. 7A

| GENERAL | LAYOUT | SOURCE | FINISHING | PRINT QUALITY | COVER | SUPPORT/DEVICE | DEVICE SETTINGS | ADMINISTRATOR SETTINGS |

ORIGINAL SIZE : A4
OUTPUT PAPER SIZE : SAME AS ORIGINAL SIZE [ADVANCED...]
PAPER TYPE : NORMAL PAPER
PRINT ORIENTATION : PORTRAIT
NUMBER OF COPIES : 1 COPIES(1~9999)
☐ DOUBLE-SIDED PRINTING
BINDING DIRECTION : PORTRAIT
☐ BOOKBINDING PRINT [ADVANCED...]
☐ AGGREGATE PAGES 2in1
STAPLING NONE
☐ UPPER-LEFT (ONE LOCATION) [LEFT RIGHT]
COLOR MODE COLOR

FAVORITES
- 2in1 (ONE-SIDED)
- 2in1 (DOUBLE-SIDED)
- DOUBLE-SIDED
- CONFIDENTIAL

[REGISTER]

[RESTORE PRINT SETTINGS TO DEFAULTS]
[RESTORE TO DEFAULTS]

[OK] [CANCEL] [HELP]

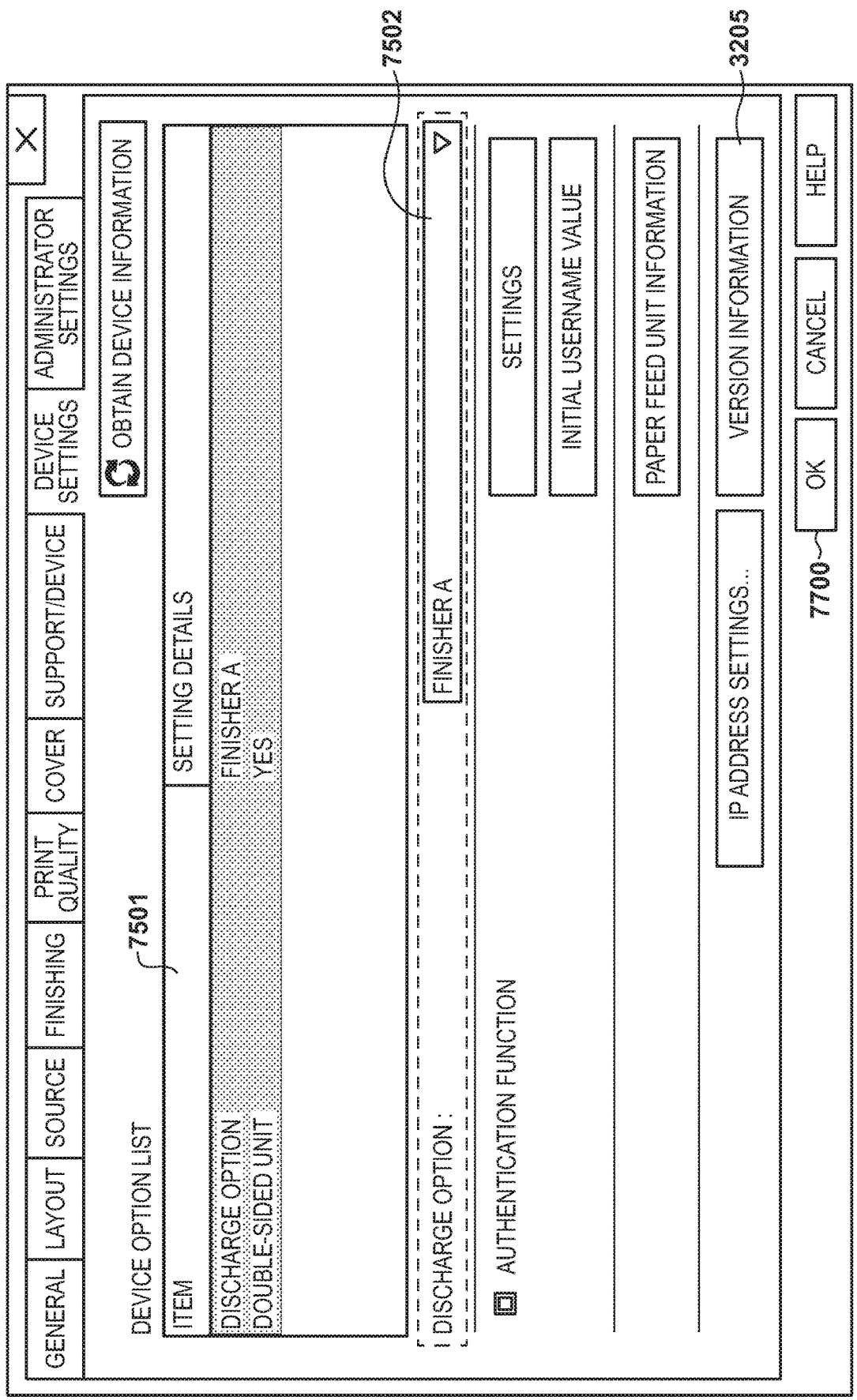

FIG. 10C

Printer Driver Installer Ver5.00 — 10200

THE LIPSLX V4 WILL BE INSTALLED ON THIS COMPUTER.
SELECT THE SETUP METHOD AND CLICK "NEXT" — 10201

PRINTER SETUP METHOD(S)

● STANDARD SETUP
  SEARCHES FOR PRINTER ON THE NETWORK
  AND INSTALLS THE DRIVER.
  ☐ ALSO SEARCH FOR PRINTERS IN SLEEP STATE

○ CUSTOM SETUP
  SPECIFY A PORT OR IP ADDRESS AND
  INSTALL THE DRIVER ON A LOCALLY- OR
  NETWORK-CONNECTED PRINTER.
  SHARED PRINTER SETTINGS CAN ALSO BE MADE. — 10203

○ USB CONNECTION SETUP
  INSTALLS THE DRIVER ON A USB-CONNECTED
  PRINTER. — 10202

SHOW Readme FILE(R)    NEXT(N)>    CANCEL — 10204

FIG. 10D

Printer Driver Installer Ver5.00 — 10300

SELECTION OF PRINTER FOR INSTALLATION
SELECT THE PRINTER YOU WISH TO ADD AND CLICK "NEXT".

| IPv4 DEVICES | IPv6 DEVICES | WSD DEVICES |

PRINTER LIST(L):

| DEVICE NAME | PRODUCT NAME | IP ADDRESS | MAC ADDRESS |
|---|---|---|---|
| ☐ MFP 1000 | MFP 1000 | xxx.xxx.xxx.xxx | 0:14:4f:55:ea:f5 |
| ☐ SFP 1000 | SFP 1000 | yyy.yyy.yyy.yyy | 0:5e:f6:88:63:c2 |

— 10301

SELECT ALL(A)>    RESCAN(R)

☐ DISPLAY ALL MODELS FOR WHICH INSTALLATION IS POSSIBLE(A)

<BACK(B)    NEXT(N)>    CANCEL — 10303

FIG. 12A

```xml
<?xml version="1.0" encoding="UTF-8"?>
    <Properties xmlns="http://active/pdrv/driverconfiguration/v100">
        <Printer Modelname="MFP 1000">
            <Customized>ON</Customized>
            <PrefixString>MFP 1000¥</PrefixString>
        </Printer>
        <Printer Modelname="MFP 2000">
            <Customized>OFF</Customized>
            <PrefixString>MFP 1000¥</PrefixString>
        </Printer>
        <Printer Modelname="SFP 1000">
            <Customized>ON</Customized>
            <PrefixString>SFP 1000¥</PrefixString>
        </Printer>
        <Printer Modelname="SFP 2000">
            <Customized>OFF</Customized>
            <PrefixString>SFP 2000¥</PrefixString>
        </Printer>
    </Properties>
```

1230 → `<Printer Modelname="MFP 1000">`
1231 → `<Customized>ON</Customized>`
1232 → `<PrefixString>MFP 1000¥</PrefixString>`

FIG. 12B

```xml
<?xml version="1.0" encoding="UTF-8"?>
<Features xmlns="http://active/pdrv/driverconfiguration/v100">
  <Feature Name="CustomCode">
    <Value>
      <Data>Custom Driver</Data>          ← 1210
    </Value>
  </Feature>
  <Feature Name="CustomDriverVersion">
    <Value>
      <Data>6.1.0.0</Data>                ← 1211
    </Value>
  </Feature>
  <Feature Name="CustomApplicationName">
    <Value>
      <Data>Cusom Tool</Data>             ← 1212
    </Value>
  </Feature>
  <Feature Name="CustomApplicationVersion">
    <Value>
      <Data>1.0.0.0</Data>                ← 1213
    </Value>
  </Feature>
</Features>
```

F I G. 12C

```xml
<?xml version="1.0" encoding="utf-8"?>
<CustomDefault xmlns="http://www.canon.com/ns/active/pdrv/custom/default/v100">
    <PrintSettingsDelta>
        <psf:PrintTicket xmlns:psf="http://2003/08/printing/printschemaframework"
xmlns:xsi="http://www.w3.org/2001/XMLSchema-instance"
xmlns:xsd="http://www.w3.org/2001/XMLSchema"
version="1"
xmlns:ns0000="http://www.canon.com/ns/printschema/oip/v200"
xmlns:psk="http://schemas.microsoft.com/windows/2003/08/printing/printschemakeywords"
xmlns:pskv11="http://schemas.microsoft.com/windows/2013/05/printing/printschemakeywordsv11">
            <psf:Feature name="psk:PageOutputColor">
                <psf:Option name="psk:Monochrome" />
            </psf:Feature>
        </psf:PrintTicket>
    </PrintSettingsDelta>
</CustomDefault>
```

```xml
<?xml version="1.0" encoding="UTF-8"?>
-<Properties xmlns="http://2011/08/printing/queueproperties">
 -<Property Name="ColorProfileInformation">
  <String/>
 </Property>
 -<Property Name="CustomDefault">           ← 1220
  <String/>
 </Property>
 -<Property Name="CustomFavoritesData">
  <String/>
 </Property>
 -<Property Name="CustomFavoritesList">
  <String/>
 </Property>
 -<Property Name="CustomItem">
  <String/>
 </Property>
 -<Property Name="CustomObjective">
  <String/>
 </Property>
 -<Property Name="CustomQPBData">
  <String/>
 </Property>
 -<Property Name="CustomUIControl">
  <String/>
 </Property>
 -<Property Name="CustomWatermarksData">
  <String/>
 </Property>
 -<Property Name="CustomWatermarksList">
  <String/>
 </Property>
 -<Property Name="FormFileInformation">
  <String><XmlData><Feature Name="DriverUIOverlayFileList"/></XmlData> </String>
 </Property>
 -<Property Name="MediaTypeInformation">
  <String><XmlData><Feature Name="DriverUIMediaType2"/></XmlData> </String>
 </Property>
 -<Property Name="Config:PrinterOptionPODDeckLiteB1">
  <String>Installed</String>
 </Property>
 -<Property Name="Config:PrinterInfoDrawer4">
  <String>Installed</String>           ← 1221
 </Property>
 -<Property Name="Config:AdminInfoAlwaysSecurePrint">
  <String>AlwaysSecurePrint</String>
 </Property>
</Properties>
```

F I G. 13A

```xml
<?xml version="1.0" encoding="utf-8"?>
<FavoritesList xmlns="http://www.canon.com/ns/acive/pdrv/favorites/list/v100">
    <Favorite Type="custom" Id="C03F9899-8B65-45F4-AE7E-76285C81715B" Editable="true" Index="0">
        <Name>Sample1</Name>
        <IconID>2</IconID>
        <Comment>Comment 1</Comment>
    </Favorite>
</FavoritesList>
```

1300

F I G. 13B

```xml
<?xml version="1.0" encoding="utf-8"?>
<WatermarksList xmlns="http://www.canon.com/ns/active/pdrv/watermarks/list/v100">
    <Watermark Type="custom" Id="C03F9899-8B65-45F4-AE7E-76285C81715B" Editable="true" Index="0">
        <Name>Confidential</Name>
    </Watermark>
</WatermarksList>
```

FIG. 13C

```xml
<?xml version="1.0" encoding="utf-8"?>
<FavoritesData xmlns="http://www.canon.com/ns/active/pdrv/favorites/data/v100">
    <Favorite Id="C03F9899-8B65-45F4-AE7E-76285C81715B">
        <PrintSettingsDelta>
            <psf:PrintTicket xmlns:psf="http://printing/printschemaframework"
xmlns:xsi="http://www.w3.org/2001/XMLSchema-instance"
xmlns:xsd="http://www.w3.org/2001/XMLSchema"
version="1"
xmlns:ns0000="http://www.canon.com/ns/printschema/oip/v200"
xmlns:psk="http://schemas.microsoft.com/windows/2003/08/printing/printschemakeywords"
xmlns:pskv11="http://schemas.microsoft.com/windows/2013/05/printing/printschemakeywordsv11">
                <psf:Feature name="psk:PageOutputColor">
                    <psf:Option name="psk:Monochrome" />
                </psf:Feature>
            </psf:PrintTicket>
        </PrintSettingsDelta>
    </Favorite>
</FavoritesData>
```

FIG. 13D

```xml
<?xml version="1.0" encoding="UTF-8"?>
<WatermarksData xmlns="http://www.canon.com/ns/active/pdrv/watermarks/data/v100">
    <Watermark Id="C03F9899-8B65-45F4-AE7E-76285C81715B">
        <PrintSettingsDelta>
            <psf:PrintTicket xmlns:psf="http://printing/printschemaframework"
xmlns:xsi="http://www.w3.org/2001/XMLSchema-instance" xmlns:xsd="http://www.w3.org/2001/XMLSchema"
version="1"
xmlns:ns0000="http://www.canon.com/ns/printschema/oip/v200"
xmlns:psk="http://schemas.microsoft.com/windows/2003/08/printing/printschemakeywords"
xmlns:pskv11="http://schemas.microsoft.com/windows/2013/05/printing/printschemakeywordsv11">
                <psf:Feature name="ns0000:PageWatermarkPrintFontStyle">
                    <psf:Option name="ns0000:Regular" />
                </psf:Feature>
                <psf:Feature name="ns0000:PageWatermarkPrintAngleType">
                    <psf:Option name="ns0000:Manual" />
                </psf:Feature>
                <psf:Feature name="ns0000:PageWatermarkPrintBorder">
                    <psf:Option name="ns0000:Circle" />
                </psf:Feature>
                <psf:Feature name="ns0000:PageWatermarkPrintLayering">
                    <psf:Option name="ns0000:Overlay" />
                </psf:Feature>
                <psf:ParameterInit name="ns0000:PageWatermarkPrintTextColor">
                    <psf:Value xsi:type="xsd:string">#7F808080</psf:Value>
                </psf:ParameterInit>
                <psf:ParameterInit name="ns0000:PageWatermarkPrintTextFontSize">
                    <psf:Value xsi:type="xsd:integer">72</psf:Value>
                </psf:ParameterInit>
                <psf:ParameterInit name="ns0000:PageWatermarkPrintTransparency">
                    <psf:Value xsi:type="xsd:integer">50</psf:Value>
                </psf:ParameterInit>
                <psf:ParameterInit name="ns0000:PageWatermarkPrintTextText">
                    <psf:Value xsi:type="xsd:string">Confidential</psf:Value>
                </psf:ParameterInit>
                <psf:ParameterInit name="ns0000:PageWatermarkPrintTextFontName">
                    <psf:Value xsi:type="xsd:string">MSP MINCHO</psf:Value>
                </psf:ParameterInit>
                <psf:ParameterInit name="ns0000:PageWatermarkPrintAngle">
                    <psf:Value xsi:type="xsd:integer">0</psf:Value>
                </psf:ParameterInit>
                <psf:ParameterInit name="ns0000:PageWatermarkPrintRelatedPositionWidth">
                    <psf:Value xsi:type="xsd:integer">0</psf:Value>
                </psf:ParameterInit>
                <psf:ParameterInit name="ns0000:PageWatermarkPrintRelatedPositionHeight">
                    <psf:Value xsi:type="xsd:integer">0</psf:Value>
                </psf:ParameterInit>
            </psf:PrintTicket>
        </PrintSettingsDelta>
    </Watermark>
</WatermarksData>
```

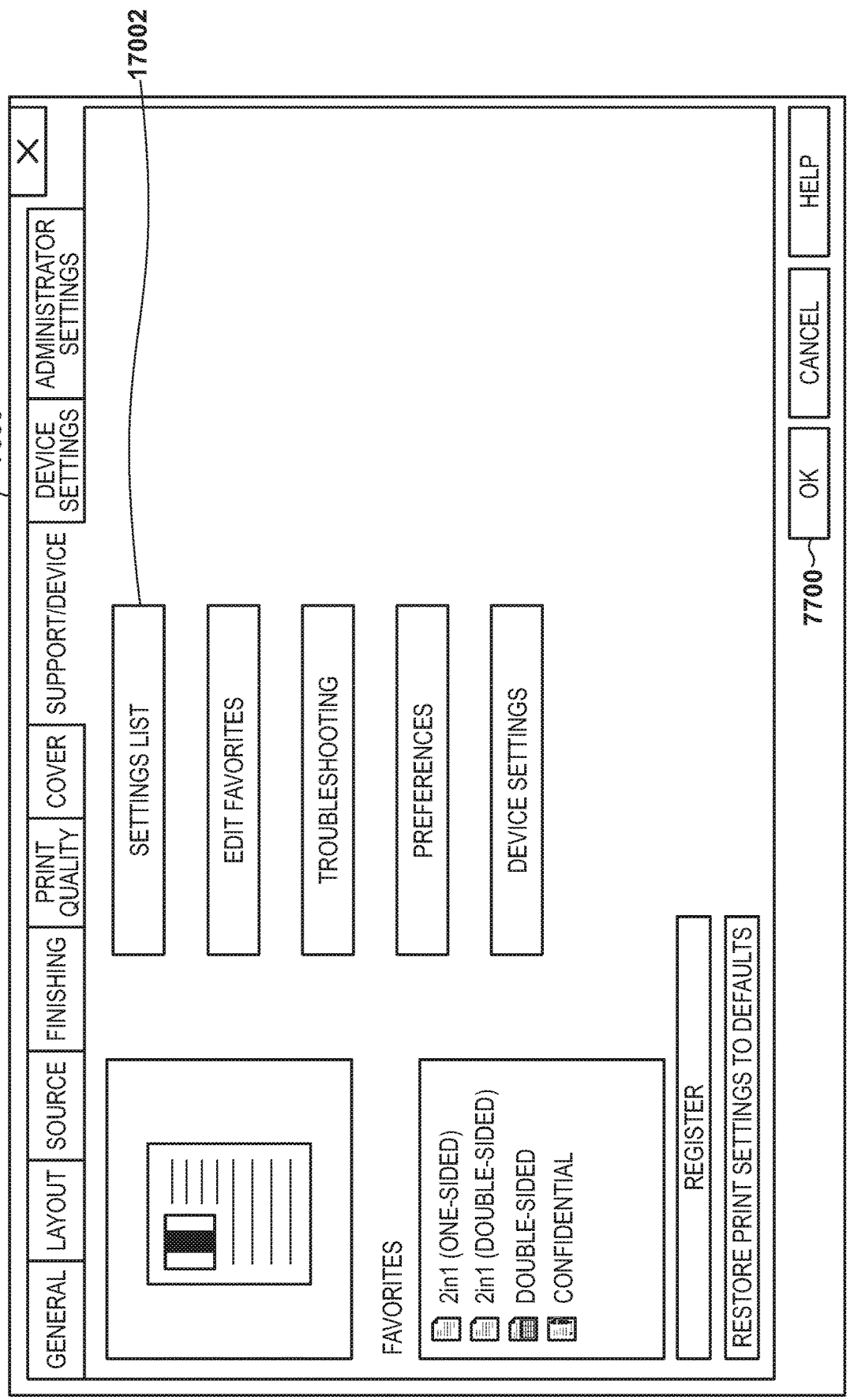

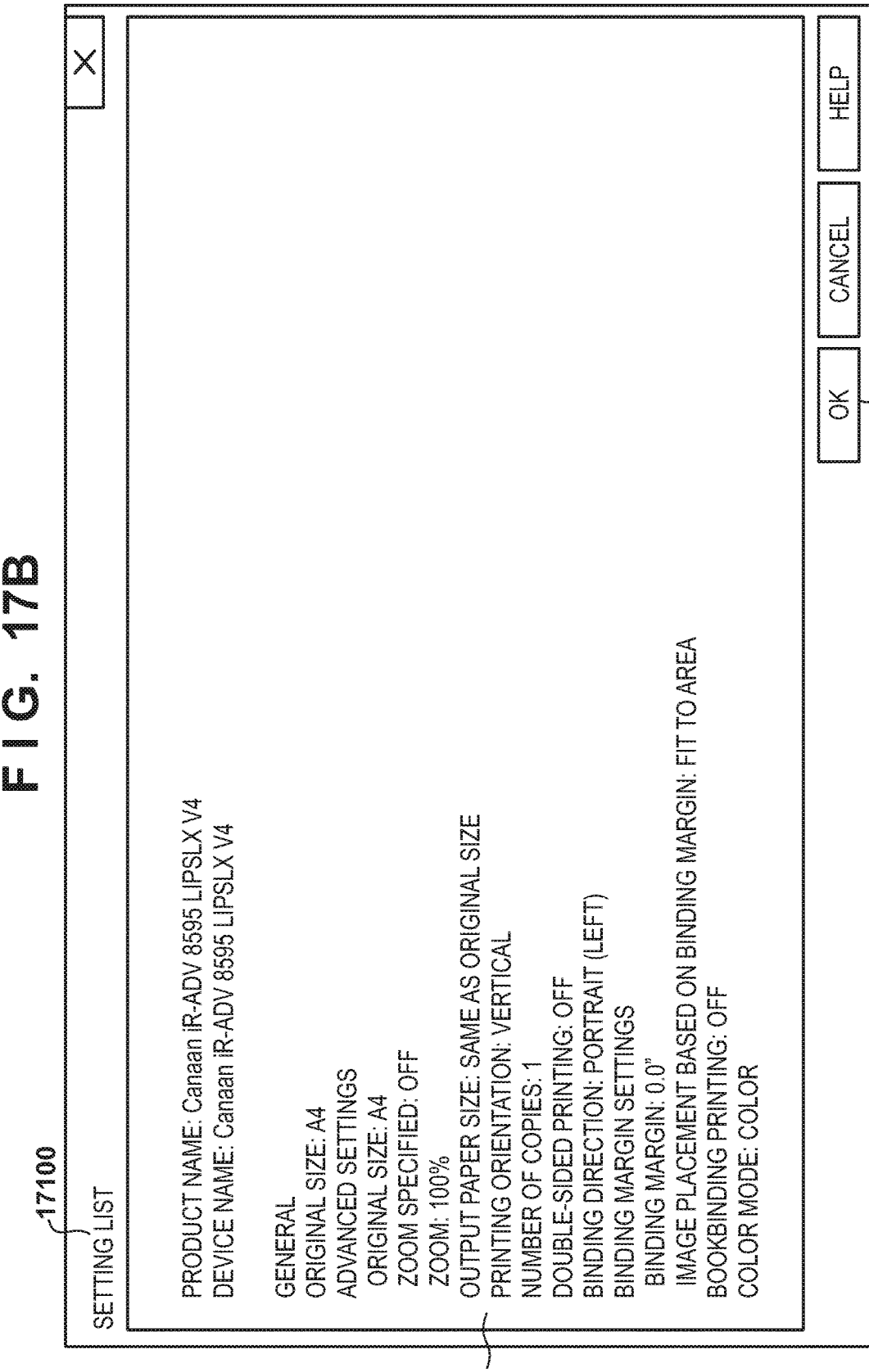

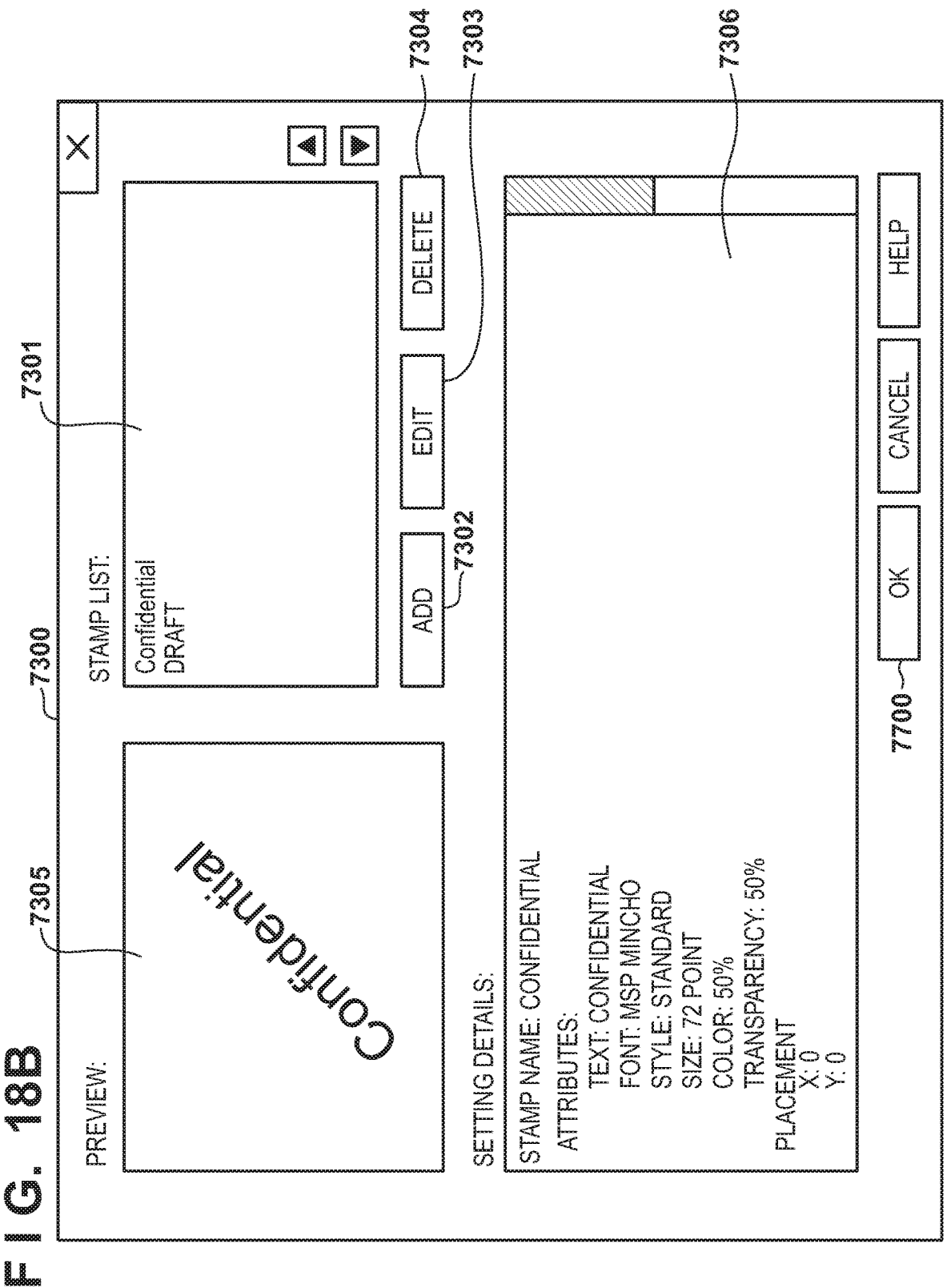

INFORMATION PROCESSING APPARATUS AND DRIVER CUSTOMIZING METHOD

BACKGROUND OF THE INVENTION

Field of the Invention

This invention relates to an information processing apparatus and a driver customizing method, and particularly relates to installing customized drivers.

Description of the Related Art

A printer driver is a module that is installed in a client computer and that carries out rendering processes and the like in accordance with print settings, print requests, and the like made for a corresponding printer. Incidentally, there is market demand for the ability to create driver sets in which the default print settings for a printer driver have been changed. For example, an IT administrator creates a customized driver set by changing the default print settings provided by the vendor of the printer to customize the settings, and then individual users install the customized driver set. This has an effect of reducing the number of steps required to change the print settings in the printer driver after installation. Vendors are exploring methods for easily creating customized driver sets to meet such demand.

Japanese Patent Laid-Open No. 2006-209195 discloses a method of changing device settings such as stapling or cassettes in a printer driver in advance, the device settings being an example of print settings.

The types of print settings in printer drivers are becoming more diverse, and a major increase in the information required for customization has become a problem with respect to creating customized driver sets.

Recent printer drivers, however, provide a method called "point and print", in which a single customized driver is installed in a server PC (personal computer), and a client PC then copies the customized driver, which is installed in the server PC, to a local location and uses the driver.

To use a customized driver with point and print, the information required for customization must be transferred to the client PC from the server PC. However, with a V4 driver, which is a type of Windows printer driver, there is very little storage space for transferring the information from the server PC to the client PC. Thus, if a large amount of information is required for the customization, the information will not fit in the storage space, and the information required for the customization cannot be transferred to the client PC.

SUMMARY OF THE INVENTION

This invention provides an information processing apparatus and a driver customizing method capable of providing customized print settings with a reduced amount of data. This invention also provides an information processing apparatus and a driver customizing method.

The present invention has the following configuration.

According to one aspect of the invention, an information processing apparatus comprising: a display unit that displays a print settings screen corresponding to a selected printer; a receiving unit that receives a change made to print settings through the print settings screen; a saving unit that, on the basis of the received change to the print settings, saves a difference from default print settings as customized print settings through a first method; and a determining unit that determines whether or not the customized print settings are saved, wherein if the determining unit has determined that the customized print settings have not been saved through the first method, the saving unit saves the customized print settings through a second method is provided.

According to this invention, customized print settings with a reduced amount of data can be provided.

Further features of the present invention will become apparent from the following description of exemplary embodiments (with reference to the attached drawings).

BRIEF DESCRIPTION OF THE DRAWINGS

FIG. 6A is a diagram illustrating a dialog of the customization tool.

FIG. 6B is a diagram illustrating a dialog of the customization tool.

FIG. 7A is a schematic diagram illustrating a print settings UI in which a general print settings tab is selected.

FIG. 7C is a schematic diagram illustrating the print settings UI in which a device settings tab is selected.

FIG. 10C is a diagram illustrating the installer settings screen.

FIG. 10D is a diagram illustrating the installer settings screen.

FIG. 12A is a diagram illustrating an example of custom model data.

FIG. 12B is a diagram illustrating an example of custom item data.

FIG. 12C is a diagram illustrating an example of custom print settings data.

FIG. 12D is a diagram illustrating an example of custom QPB data.

FIG. 13A is a diagram illustrating an example of a custom favorites list.

FIG. 13B is a diagram illustrating an example of a custom stamp list.

FIG. 13C is a diagram illustrating an example of custom favorites data.

FIG. 13D is a diagram illustrating an example of custom stamp data.

FIG. 17A is a schematic diagram illustrating a support tab in the print settings UI.

FIG. 17B is a schematic diagram illustrating a settings list dialog.

FIG. 18B is a schematic diagram illustrating a stamp details dialog.

DESCRIPTION OF THE EMBODIMENTS

First Embodiment
System Configuration

Figure 1:
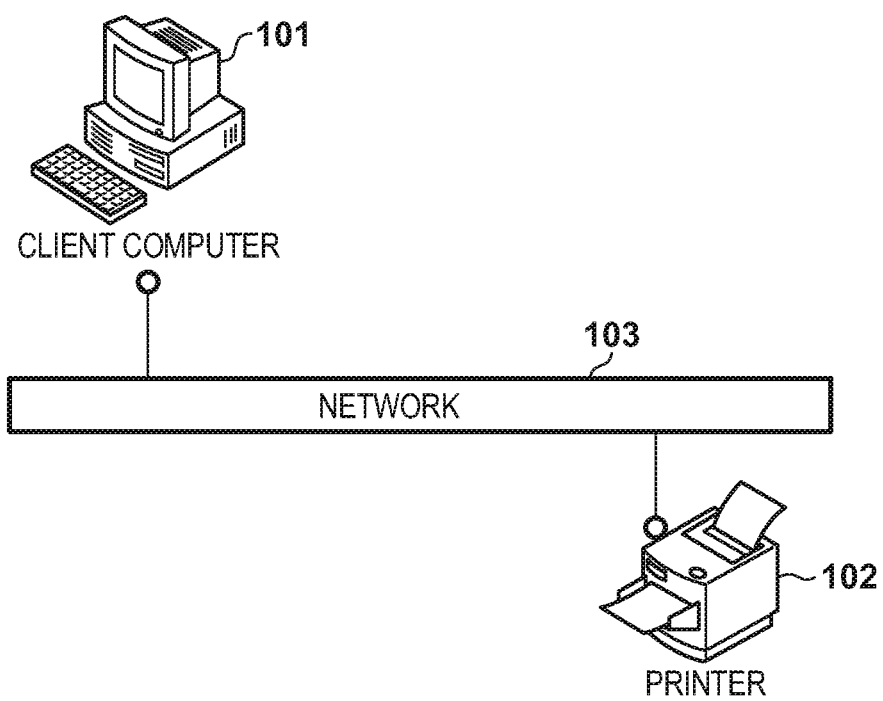
FIG. 1 is a diagram illustrating a system configuration.

FIG. 1 is a schematic diagram illustrating an overview of a system configuration according to the invention. This system includes a client computer 101, which is an example of an information processing apparatus, and a printer 102, which is capable of receiving and printing page description language (PDL) format print data. These can communicate with each other over a network 103 including a Wide Area Network (WAN). The printer 102 may be a single-function printer including only a printing function, or a multi-function printer including a printing function, a scanning function, and a copying function. The client computer 101 is not limited to a single computer on the network 103, and a plurality of computers may be connected.

Figure 2:
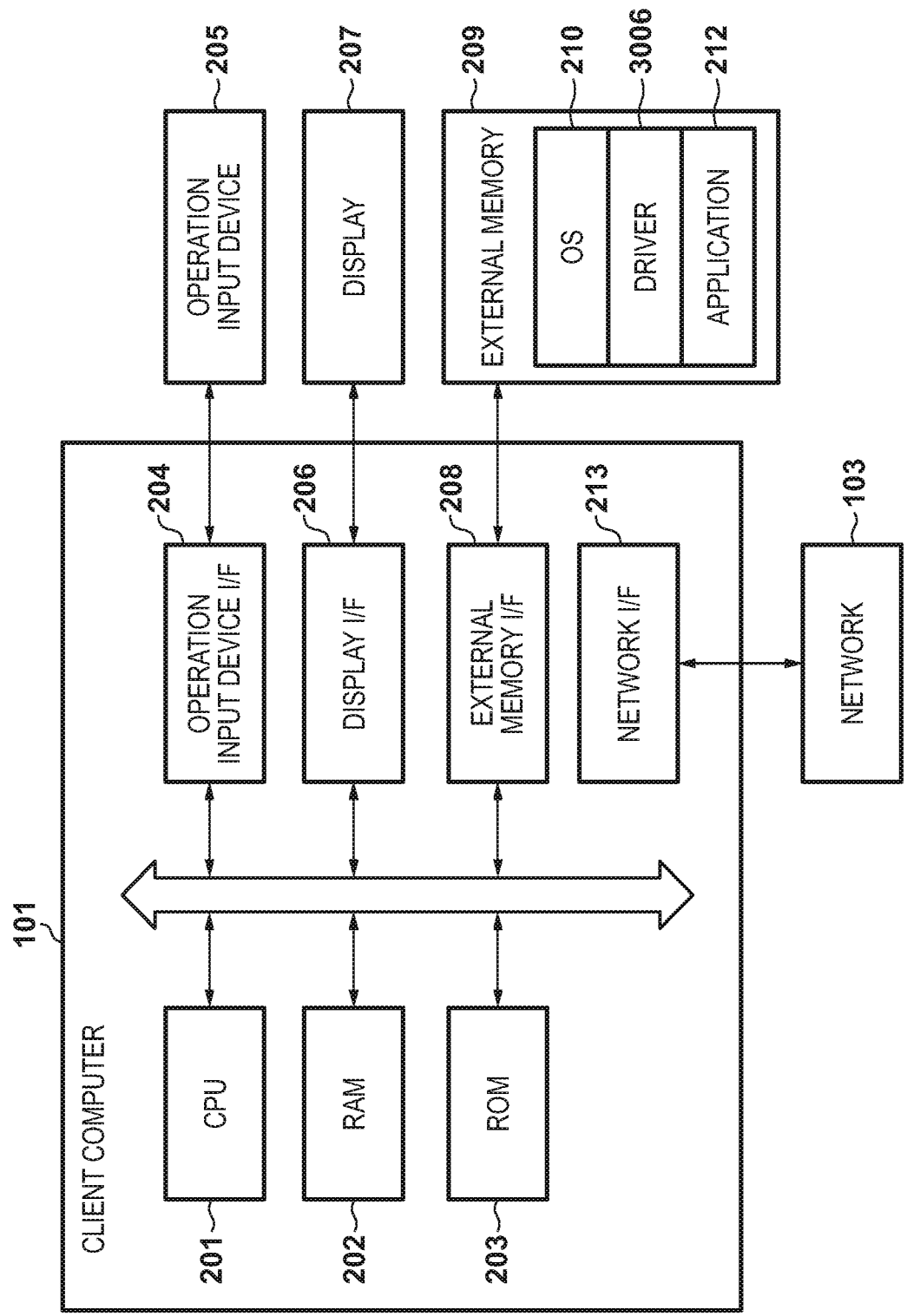
FIG. 2 is a diagram illustrating the hardware configuration of a client computer.

FIG. 2 is a block diagram illustrating the hardware configuration of the client computer 101 illustrated in FIG. 1. In the client computer 101, a central processing unit (CPU) 201 controls various devices connected to a system bus in accordance with programs stored in random access memory (RAM) 202. The client computer 101 includes at least one CPU 201. Additionally, the software configuration of the client computer 101 and the processes of the steps in the flowcharts described later are realized by the CPU 201 executing processes on the basis of programs stored in external memory 209. The RAM 202 functions as the main memory, a work area, and so on for the CPU 201. Read-only memory (ROM) 203 stores various types of programs such as a boot program and a basic in-out system (BIOS). An operation input device interface (I/F) 204 is an interface that controls an operation input device 205 such as a keyboard, a pointing device (a mouse), a touch-based user interface (UI), and so on. A display I/F 206 controls the display of screens in a display 207. An external memory I/F 208 controls access to the external memory 209, which is a hard disk (HD), a solid-state disk (SSD), or the like, for example. The external memory 209 functions as a storage medium, readable by the client computer 101, that stores an operating system program (OS) 210, applications 212 corresponding to a touch panel and a desktop respectively, drivers 3006 including a printer driver, various types of files, and so on. A network I/F 213 is connected to the printer 102 over the network 103 and carries out communication control processes. The printer 102 includes the same hardware configuration as the client computer 101, and operates in a similar manner.

Although the hardware configuration of the printer 102 is not particularly illustrated here, the printer 102 includes a printer mechanism for functioning as a printer, and a control unit for the printer mechanism, in addition to a CPU, memory, a network interface, and the like. If the printer 102 has multiple functions, the printer 102 further includes configurations corresponding to those functions, such as a scanner, facsimile, storage, and so on.

Configuration of Customization Tool

Figure 3A:
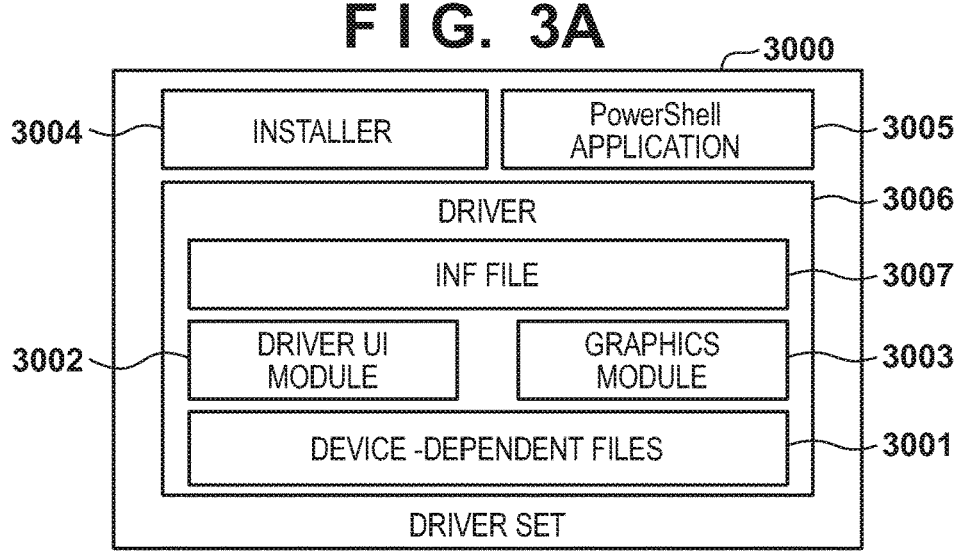
FIG. 3A is a diagram illustrating the configuration of a driver set.
Figure 3B:
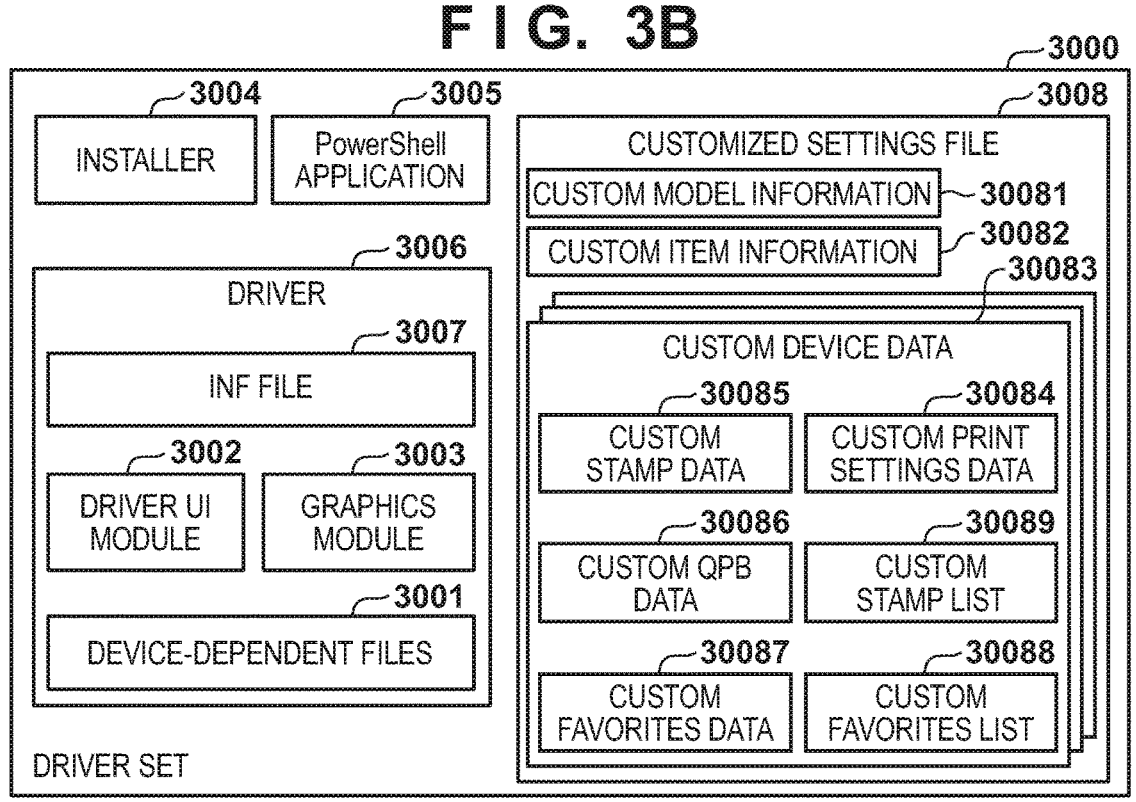
FIG. 3B is a diagram illustrating the configuration of a customized driver set.
Figure 3C:
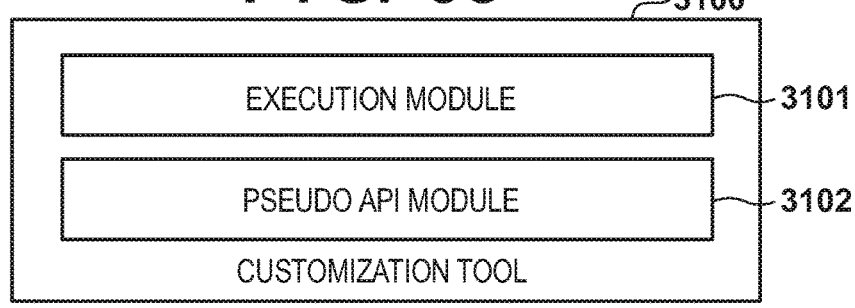
FIG. 3C is a diagram illustrating the configuration of a customization tool.

The overall configuration of a customization tool will be described with reference to FIGS. 3A to 3C. The customization tool is software for customizing the printer driver. A driver set will be described first with reference to FIG. 3A. A driver set 3000 is a group of files and modules of the driver 3006 required for installing the driver 3006 in the OS 210. The driver 3006 is a printer driver, for example, and includes modules, device-dependent file groups, and so on for performing rendering required during printing. Device-dependent files 3001 include file groups for a list of prohibition rules and functions of each of devices, factory print settings and default print settings for each of locales, and the like. A driver UI module 3002 is a module that is called at the time of printing after the driver 3006 has been installed in the OS 210, and provides a user interface so that a user can easily change the print settings. The driver UI module 3002 can also be loaded and called from another one of the applications 212, even before being installed in the OS 210. A graphics module 3003 converts a file to be printed into page description language (PDL) data when the driver 3006 carries out printing. An INF file 3007 is a file containing settings information such as a list of devices supported by the driver set 3000, a list of required modules required by the printer drivers of the supported devices, and so on. An installer 3004 is launched through the operation input device 205 from the exterior, and installs the driver 3006 in the OS 210. A PowerShell application 3005 is one of the applications 212, and upon being launched from the operation input device 205 or from another one of the applications 212, can call a PowerShell API. "PowerShell" is a command line base extensible script language included in Windows (registered trademark), and enables a variety of APIs in the OS 210 to be called at the command line base.

Customized Driver Set

A customized driver set will be described with reference to FIG. 3B. The customized driver set has a configuration in which a customized settings file has been added to the driver set 3000 illustrated in FIG. 3A. Thus numbers already described with reference to FIG. 3A will not be mentioned here.

A customized settings file 3008 is written into a location accessible by the driver 3006 during installation, and is used to change the settings of the driver 3006 to customized settings immediately after the driver 3006 has been installed.

The customized settings file 3008 includes custom model data (also called "custom model information") 30081, custom item data 30082, and custom device data 30083. The custom model data 30081 includes data of a list of printer models subject to installation with the customized driver set. A user of a customized driver set can carry out the installation only for printer models selected as desired by the creator of the customized driver set. Note that it is not absolutely necessary to customize a printer model selected for installation.

The custom item data (also called "custom item information") 30082 includes data of a version number of the customized driver set, a version number of a customization tool 3100 that created the customized driver set, and so on. The custom device data 30083 is a folder holding information necessary for customization for each printer model, and is created for each customized printer model. Accordingly, even if a printer model is subject to customized driver set installation, the custom device data 30083 is not created for the printer model if it is not customized. The custom device data 30083 includes data for customizing the driver 3006, such as custom print settings data 30084, custom stamp data 30085, a custom stamp list 30089, custom Queue Property Bag (QPB) data 30086, a custom favorites list 30088, and custom favorites data 30087. "Property bag" refers to a function for holding related information as a collection of key/value sets. "Favorite" refers to a combination of settings for each user specified by that user, for example.

The custom print settings data 30084 is information for customizing the print settings. The custom stamp list 30089 and the custom stamp data 30085 are data used when customizing stamps. "Stamp" refers to a function for printing watermarks with text such as "confidential" or "copy" over the print data. The custom stamp list 30089 is data indicating a list of the names of stamps created during customization, and holds information of identifiers and so on of a plurality of stamps. The custom stamp data 30085 is a collection of information of settings values of stamps created during customization. The custom stamp data 30085 includes setting values for a plurality of stamps, and each item in the custom stamp list 30089 corresponds one-to-one with the information of the setting values of the stamps in the custom stamp data 30085.

The custom QPB data 30086 is information for customizing device settings, administrator settings, and so on. The custom favorites list 30088 is information including custom favorite names and the like in list form, and includes data of one or more favorites. The custom favorites data 30087 is information, used in a function called "favorites" that enables multiple print settings to be set simultaneously, for registering favorites data that has been customized in advance, and is a collection of information of print settings. The custom favorites data 30087 also includes a collection of multiple print settings. The items in the custom favorites list 30088 and the data of the print settings in the custom favorites data 30087 are associated on a one-to-one basis. The data in individual customized settings files 3008 will be described in detail later.

Customization Tool

The customization tool 3100 will be described next with reference to FIG. 3C. The customization tool 3100 creates the customized settings file 3008 on the basis of the driver set 3000. An execution module 3101 is an execution module of the customization tool 3100, and displays a UI of the customization tool 3100, for example. A pseudo API module 3102 is a pseudo API for creating the customized settings file 3008. Normally, the driver UI module 3002 runs upon being called from the OS 210. The driver UI module 3002 then implements various functions using an OS API 4004 (see FIG. 4). Although details will be given later, the execution module 3101 calls and uses the driver UI module 3002 directly before the driver UI module 3002 is installed in the OS 210. As such, the driver UI module 3002 cannot use the OS API 4004. Accordingly, the pseudo API module 3102 is used as a replacement API for the OS API 4004. In other words, the execution module 3101 uses the driver UI module 3002 via the pseudo API module 3102.

Customized Settings File

The customized settings file 3008 will be described next with reference to FIGS. 12A to 12D and 13A to 13D. FIG. 12A illustrates an example of the custom model data 30081, which is written in markup language. The custom model data 30081 includes a Properties element, and the Properties element includes one or more PrinterModel elements. A PrinterModel element 1230 holds a Customized element 1231 and a PrefixString element 1232 as child elements. The Customized element 1231 indicates whether or not the parent PrinterModel element 1230 can be installed with the customized driver set. The Customized element 1231 being ON indicates that installation is possible. OFF, on the other hand, indicates that installation is not possible. The PrefixString element 1232 is printer model identifier information in which information set uniquely for the printer model is input. The printer model identifier information is used for a name when creating the custom device data 30083.

FIG. 12B illustrates an example of the custom item data 30082. The custom item data 30082 is written in markup language including multiple Feature elements, and each Feature element serves as a Feature identifier, including a Name attribute. The Feature element includes a Value element as a child element, and information is written in the Value element of each Feature.

A customization code 1210 is an example of the information written in the Value element. The customization code 1210 is information expressing a description, identifier, and so on of the customized driver. Version information 1211 is an example of the information written in the Value element, which expresses version information of the customized driver set. A name 1212 is the name of the customization tool 3100. Version 1213 is version of the customization tool 3100. Both are information written in the Value element.

FIG. 12C is an example of the custom print settings data 30084, which is information included in the custom device data 30083. The custom print settings data 30084 is created in markup language format, and holds difference data indicating a comparison with factory print settings held by the driver set 3000. Custom print settings data 1200 is an example of a case where a driver having "color" in the factory print settings (i.e., default print settings) has had those default print settings changed to "black-and-white". Customized default print settings will be called "custom default" hereinafter. The custom print settings data 30084 is created as a Feature-Option set, and the Feature is a parent of the Option in markup language. Feature expresses a function, and Option expresses a setting selected for the function. This example indicates that a setting "psk:Monochrom" is selected for the function "psk:PageOutputColor". In other words, this indicates that a setting of "black-and-white" is selected for the color settings. Custom print settings data 3084 includes only the difference from the original print settings. The original print settings data is factory-set data, for example, and is also called "factory print settings" or "standard print settings". If the print settings are held by Feature (function) elements as in FIG.

12C, it is sufficient that the custom print settings data 3084 include function elements in which values different from the standard print settings are set. If there is a hierarchical structure, there are cases where the function element can be identified only by retracing the hierarchy, and thus the higher part of the hierarchy may be held as well. Items (Features) having the same setting values as the standard print settings are not included in the custom print settings data 3084.

FIG. 12D is an example of the custom QPB data 30086, which is information included in the custom device data 30083. The custom QPB data 30086 includes "Property" elements, and all the data of items in queue information written in the device-dependent files 3001 is created for each Property element. Queue information 1220 is an example of the queue information items. The queue information 1220 includes a Name attribute, and is used as an identifier of the Property element. The queue information is settings data for both the device settings and the administrator settings, and is output using a single markup language. If not input information is present for a given item, the item is output as a blank. Device settings 1221 is an example of setting values for the device settings, and indicates that "cassette" is set.

FIG. 13A is an example of the custom favorites list 30088, which is information included in the custom device data 30083. The custom favorites list 30088 is data in which a list of information such as names of custom favorites is written, and is written in markup language. FIG. 13A illustrates an example of the custom favorites list, but other favorite data, such as normal favorites registered by a user and factory favorites present in the device-dependent information of the driver, has the same configuration.

The custom favorites list 30088 includes a FavoriteList as a parent element, and a Favorite element 1300 as a child element of the FavoriteList. Multiple pieces of information required for displaying a favorites UI can be written in the Favorite element 1300. In other words, this is a custom favorites list. The Favorite element 1300 includes Type, ID, Editable, and Index as attributes. A "Type" attribute value of the Favorite element 1300 is an attribute indicating whether or not the favorite held by the Favorite element has been created by the driver UI module 3002 called from the execution module 3101. In FIG. 13A, "custom" is indicated as an example of the type attribute. The custom type indicates that "Customized" is set for the customized favorite. Note that a favorite registered by a normal user has "User" set as the type attribute. However, a favorite set in advance at the factory has "Preset" set as the type attribute.

"ID" is written as a Globally Unique Identifier (GUID), and is used as a key associated one-to-one with a favorite print settings value saved in the custom favorites data 30087 (described later), or in other words, as association information. "Editable" is information indicating whether or not the favorite can be edited, with "True" indicating that the favorite can be edited. "Index" indicates an order of arrangement, as numbers from 0 to any desired number, and is used to determine an order when displaying the UI. The Favorite element further includes "Name", "IconID", and "Comment" as elements. "Name" indicates the name of the favorite, and "IconID" is an identifier for uniquely determining an icon when displaying the favorite. "Comment" is an element for storing a user-entered comment, and any desired character string can be stored.

FIG. 13B is an example of the custom stamp list 30089, which is information included in the custom device data 30083. The custom stamp list 30089 is data in which information such as the names of custom stamps is written as a list, and is written in markup language. Although FIG. 13B illustrates an example of the custom stamp list 30089, the data of other stamps, such as normal stamps registered by a user and factory-set stamps included in the device-dependent information of the driver 3006, have the same configuration.

The custom stamp list 30089 includes "WatermarkList" as a parent element. The WatermarkList element further includes a Watermark element list, and each Watermark element includes "Type", "ID", "Editable", and "Index" as attributes. FIG. 13B illustrates "Custom" (or "Customized") as being set as a type attribute for a customized favorite, for example. "User" is set for a stamp registered by a normal user. "Preset" is set for a stamp registered in advance at the factory.

"ID" is written as a Globally Unique Identifier (GUID), and is used as a key associated one-to-one with a stamp print settings value saved in the custom stamp data 30085 (described later). "Editable" is information indicating whether or not the favorite can be edited, with "True" indicating that the favorite can be edited. "Index" indicates an order of arrangement, as numbers from 0 to any desired number. "Name" is also included as an element. "Name" is an element indicating the name of the stamp.

FIG. 13C is an example of the custom favorites data 30087, which is one piece of information included in the custom device data 30083. The custom favorites data 30087 includes a Favorite element, and includes "ID" as an attribute. The value of "ID" is a key for association with the custom favorites list 30088, indicated in FIG. 13A, and has the same GUID value. The Favorite element includes "PrintSettingsDelta" as an element, which includes the settings values of the favorite print settings. The settings values of the favorite print settings is the difference data. In FIG. 13C, favorite print settings that set the settings values of the print settings to black-and-white is written here.

FIG. 13D illustrates the custom stamp data 30085, which is information included in the custom device data 30083. This data includes a Watermark element, with "ID" as an attribute. The value of "ID" is a key for association with the custom stamp list, indicated in FIG. 13B, and has the same GUID value. The Watermark element includes "PrintSettingsDelta" as an element, which includes the settings values of the stamp print settings. The settings values of the stamp print settings is the difference data.

Print settings Application

Figure 4:
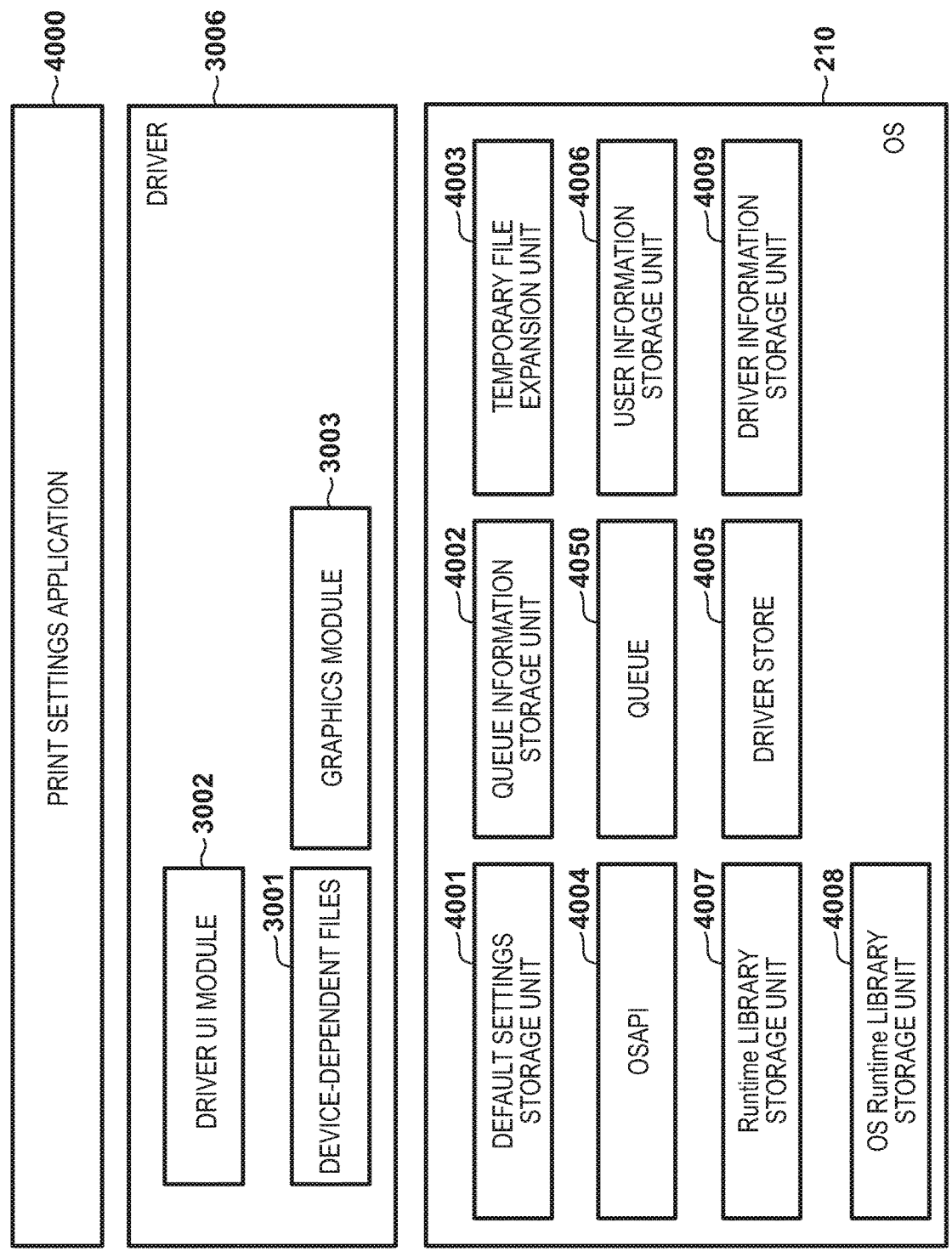
FIG. 4 is a diagram illustrating the configuration of a print settings application, a driver, and an OS.

FIG. 4 is a block diagram illustrating the OS 210, the driver 3006, and a print settings application 4000. Note that numbers already mentioned will not be described here. A printer driver 3006 includes a configuration module (not illustrated) provided by the operating system, for performing tasks such as editing the print settings. The configuration module provided by the operating system edits the print settings stored in a queue information storage unit 4002 and the like. At this time, the device-dependent information and the like, for example, are edited using the print settings application 4000 provided by the printer driver. The print settings application 4000 is written in a script language such as JavaScript (registered trademark), and is provided along with the printer driver. The print settings application 4000 is installed along with the printer driver, and can also be thought of as one module of the printer driver.

Figure 7B:
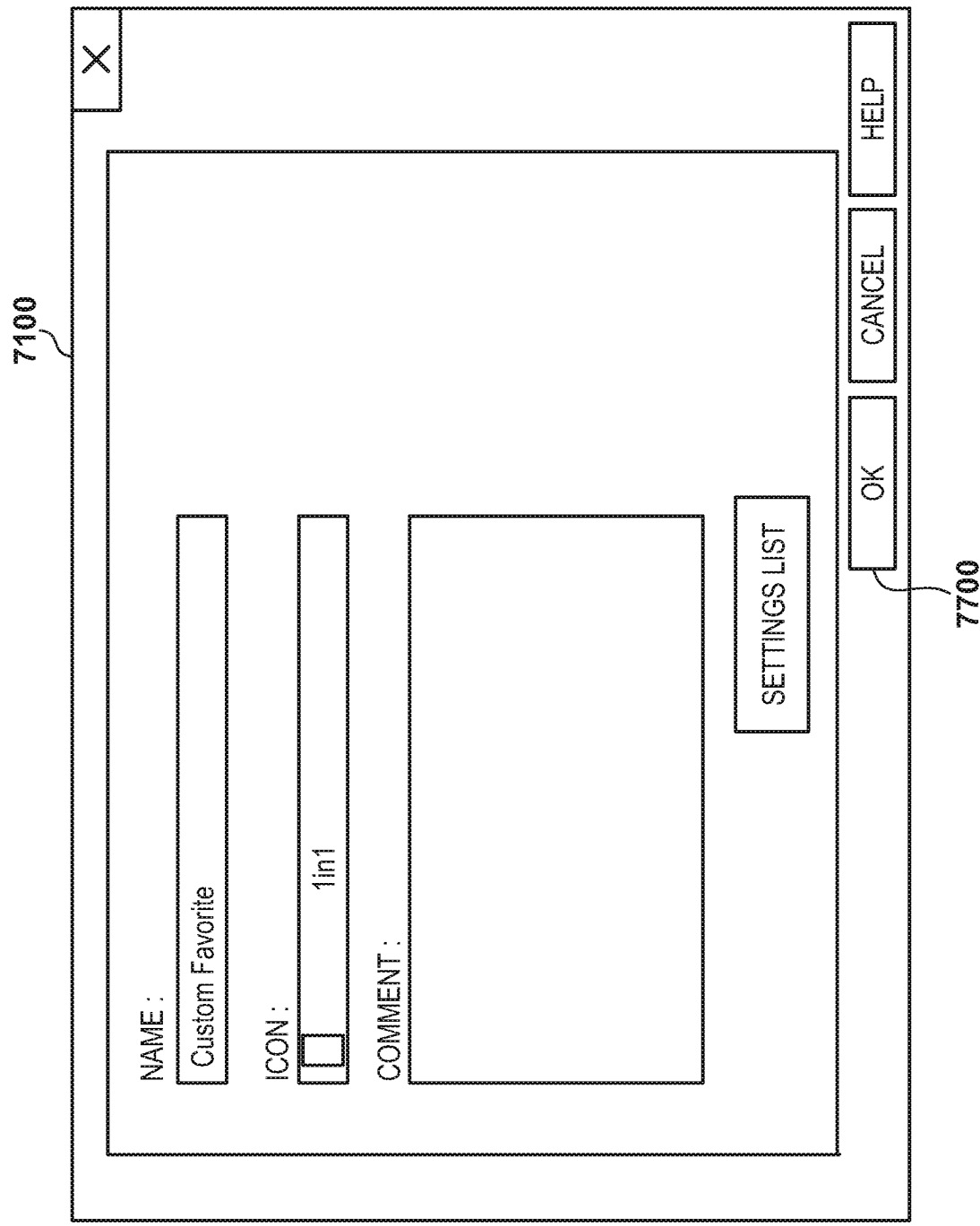
FIG. 7B is a schematic diagram illustrating a favorites registration screen.

The print settings application 4000 loads the driver UI module 3002 of the driver 3006, and displays the print settings UI 7000 illustrated in FIGS. 7A to 7C, i.e., displays a print settings screen. The print settings UI 7000 will be described later. When displaying the print settings UI 7000, print settings information such as a PrintTicket, PrintCapabilities, and the like, generated by the OS 210, are obtained from a default settings storage unit 4001, which stores the device-dependent files 3001, user default settings for the print settings, and so on. Driver information, such as factory print settings, is obtained from a driver information storage unit 4009. Furthermore, user information, such as favorites and stamps created by the user, is obtained from a user information storage unit 4006, which includes a registry, a User Property Bag (UPB), and so on. Various information, such as the customized settings file 3008, the device settings information, and administrator settings information, is obtained from the queue information storage unit 4002 including the Queue Property Bag (QPB) and the like, and the print settings UI 7000 is displayed. The print settings information, the driver information, the user information, the customized settings file 3008, the device information, and the administrator settings information are obtained via the OS API 4004. The information stored in the queue information storage unit 4002 is transferred from the server PC to the client PC and shared. The print settings UI 7000 can also be called a receiving unit that displays default print settings, for example, and receives changes made to those settings.

A temporary file expansion unit 4003 is used when, for example, the content of the driver set 3000 is compressed as a cab file or the like and the compressed file is to be temporarily decompressed, when files used during the launching of the applications 212 are to be temporarily created, and so on. The OS API 4004 is an API group provided from the OS when obtaining print settings and the like.

A driver store 4005 is a folder containing the driver 3006 managed by the OS 210, and the driver 3006 is placed in the driver store 4005 upon being installed.

A Runtime library storage unit 4007 is a region and folder provided when a Runtime library for the execution module group of the application 212, including a CRuntime (CRT) library, is installed. An OS Runtime library storage unit 4008 saves the same modules as the Runtime library but with the names changed. Note that the OS Runtime library in the OS Runtime library storage unit 4008 is sometimes not stored, depending on the environment.

Customization Tool

Next, the customization tool will be described with reference to the user interface illustrated in FIGS. 5A to 5E and 6A to 6D, and the flowcharts in FIGS. 8A, 8B, 9A, and 9B. Unless otherwise specified, the subject of these flowcharts is the execution module 3101. The applications and modules are stored in the external memory 209, loaded in the RAM 202 as necessary, and executed by the CPU 201 of the client computer 101.

Overall Customization Process

Figure 8A:
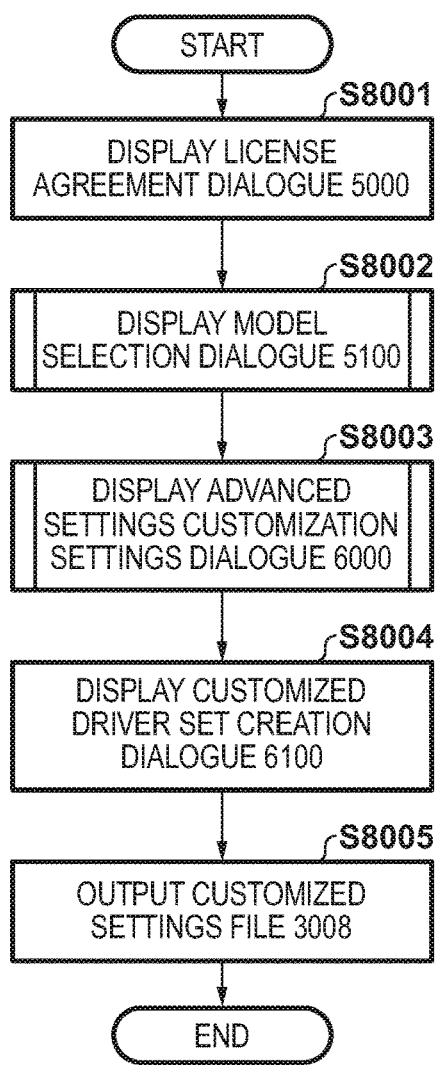
FIG. 8A is a flowchart illustrating customization by the customization tool.

FIG. 8A illustrates a procedure for creating the customized driver set. In FIG. 8A, first, the execution module 3101 displays a license agreement dialog 5000, illustrated in FIG. 5A (S8001). When the user using the operation input device 205 presses a "yes" button 5001, a process for displaying a model selection dialog 5100 is started (S8002). Step S8002 will be described in detail with reference to FIG. 8B, but the process will be described briefly here.

Figure 5A:
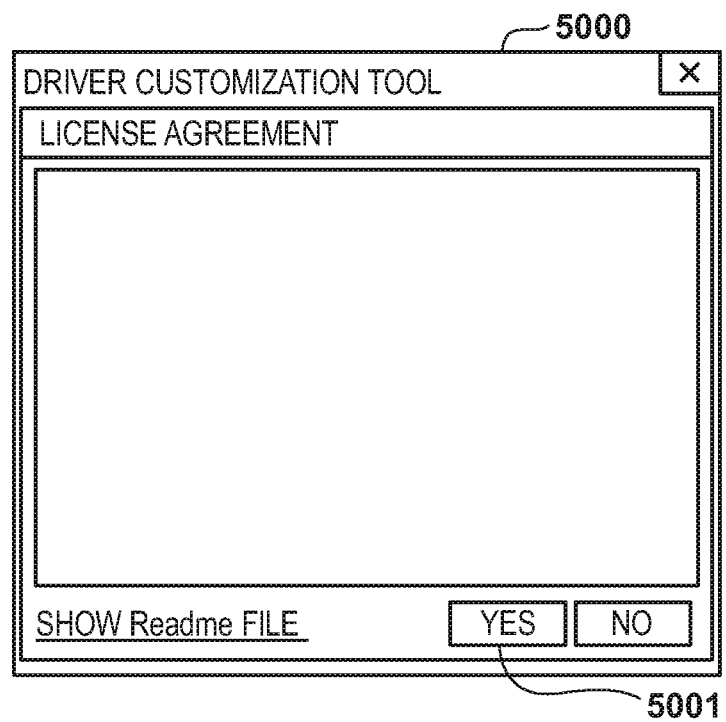
FIG. 5A is a diagram illustrating a dialog of the customization tool.
Figure 5B:
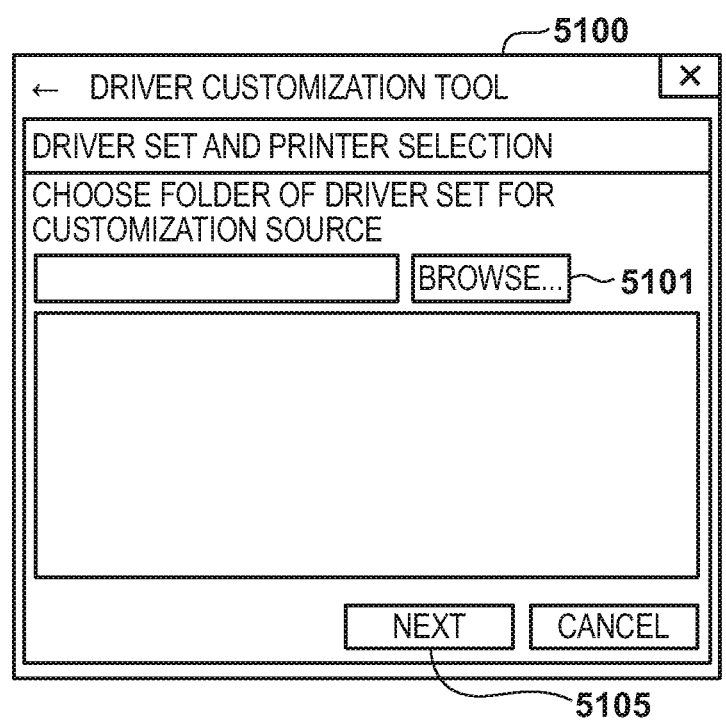
FIG. 5B is a diagram illustrating a dialog of the customization tool.
Figure 5C:
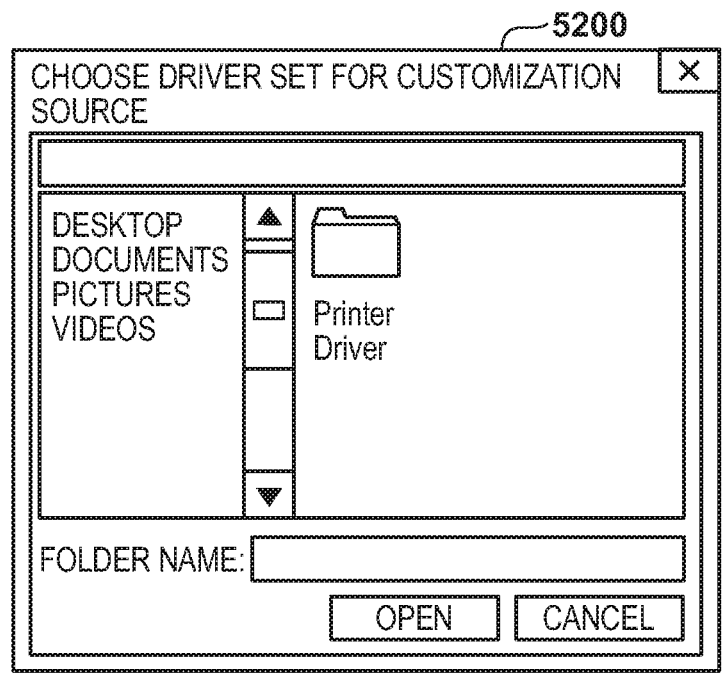
FIG. 5C is a diagram illustrating a dialog of the customization tool.
Figure 5D:
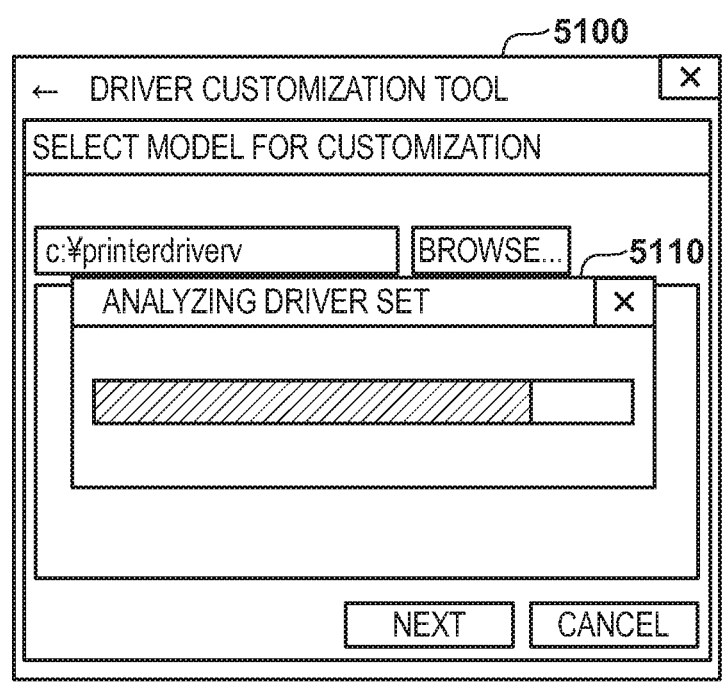
FIG. 5D is a diagram illustrating a dialog of the customization tool.
Figure 5E:
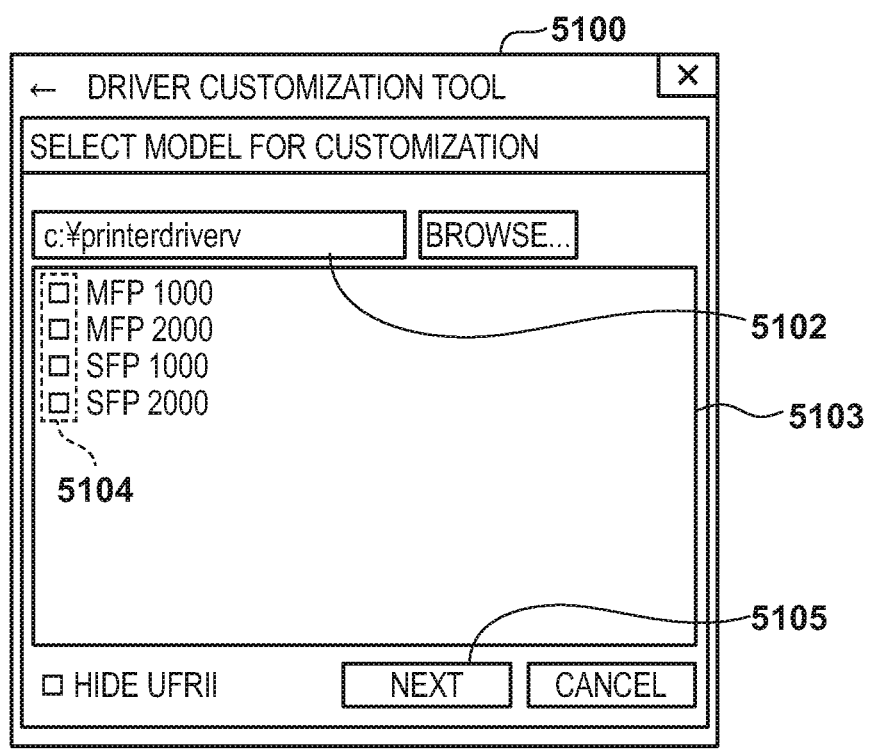
FIG. 5E is a diagram illustrating a dialog of the customization tool.

In step S8002, first, model candidates subject to customization are displayed in the model selection dialog 5100, which is a user interface of the driver customization tool (FIG. 5E). The model(s) for which a checkbox 5104 has been checked are a model or a model group designated for customization. The custom model data 30081 is created on the basis of that model group. The custom model data 30081 includes the data of a list of the selected printer models. After the custom model data 30081 has been created, the process moves to the display of an advanced customization settings dialog 6000 (illustrated in FIG. 6A) (S8003). Although step S8003 will be described in detail with reference to FIGS. 9A and 9B, it will be described here briefly. The advanced customization settings dialog 6000 displayed in step S8003 provides a list of model groups designated for customization. Here, user-made changes to the factory print settings, for example, are received through the driver UI module 3002 of the model selected in the list, and information of the differences between the post-change settings information and the pre-change settings information is created and used as custom print settings data. The execution module 3101 obtains the custom print settings data created by the driver UI module 3002.

Figure 6C:
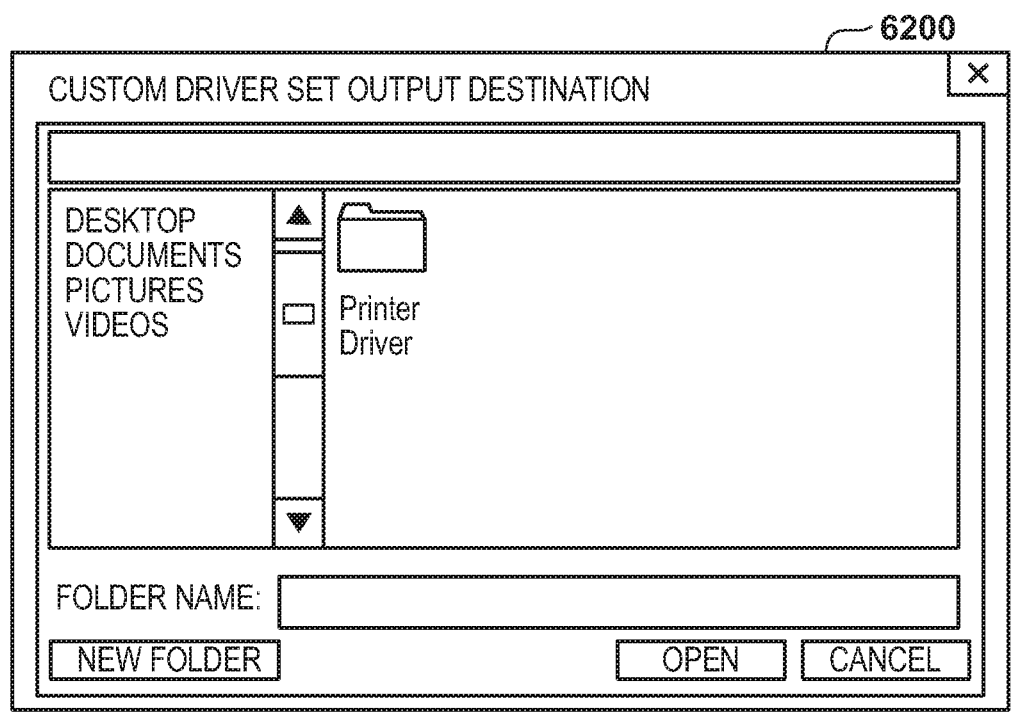
FIG. 6C is a diagram illustrating a dialog of the customization tool.

Once the custom print settings data has been obtained, the execution module 3101 then executes a process for outputting the customized driver set at the end of the customization process carried out by the customization tool 3100. The execution module 3101 displays a customized driver set creation dialog 6100, illustrated in FIG. 6B (S8004). The customized driver set creation dialog 6100 includes a browse button 6101 for specifying an output destination folder path for the customized driver set. Upon the browse button 6101 being pressed, an OS-standard folder specification dialog 6200, illustrated in FIG. 6C, is displayed. This display is realized by the execution module 3101 making a request to the OS 210, and the OS 210 receives an operation for specifying a folder through that dialog. Upon the specification operation be made through the operation input device 205, the OS 210 returns information of the folder path to the execution module 3101. Upon receiving the folder path information returned from the OS 210, the execution module 3101 displays the returned folder path in an output destination text box 6102. The customized driver set creation dialog 6100 includes a UI control 6103 for specifying a customization code for receiving a customized number and comment. The customization code received through this control is saved in the customized driver set as the custom item data 30082. After the driver 3006 has been installed, the code can be confirmed through a dialog displayed when a version information button 3205 of the print settings UI 7000 (see FIGS. 7A to 7C) is pressed.

Figure 6D:
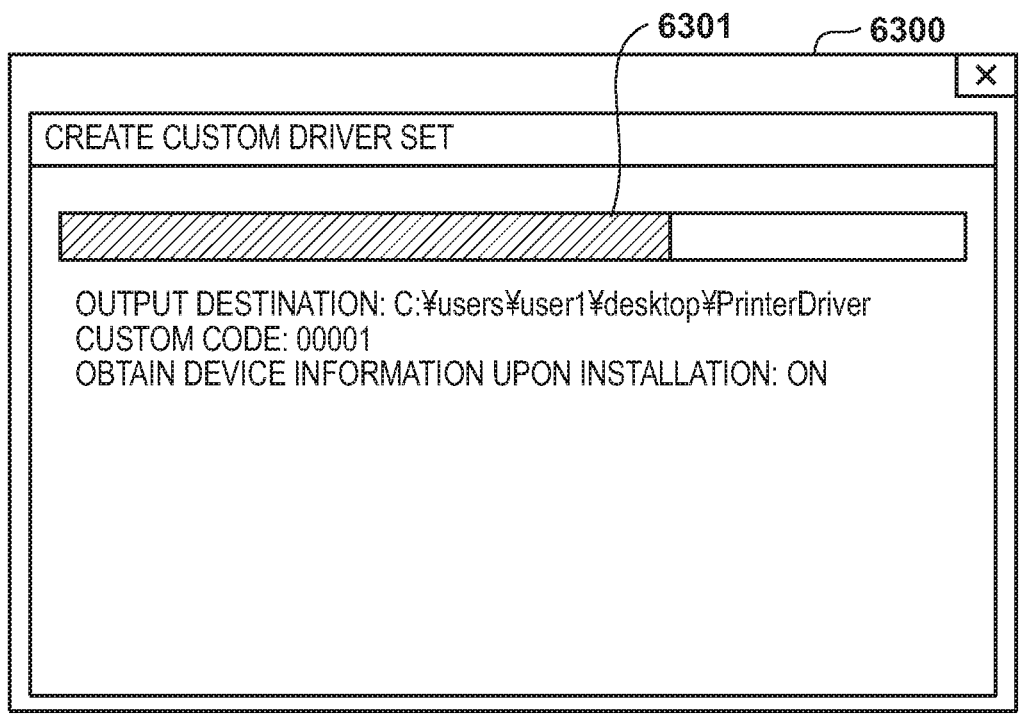
FIG. 6D is a diagram illustrating a dialog of the customization tool.

Upon a create button 6107 of the customized driver set creation dialog 6100 being pressed, the execution module 3101 displays a customized driver set creation dialog 6300, illustrated in FIG. 6D. When creating the customized driver set, it is necessary to copy the entire driver set 3000 on which the customized driver set is based for protection, and create a separate driver set. This process takes a comparatively long time. As such, the customized driver set creation dialog 6300 displays the progress of the process using a progress bar 6301.

Ultimately, the custom device data 30083 including the custom model data 30081, the custom item data 30082, and the custom print settings data 30084 is saved in the driver set 3000 as the customized settings file 3008 (S8005).

Note that if the driver set 3000 is signed, this process creates the new customized settings file 3008 without changing the driver set 3000, and thus the signature of the driver set 3000 is not affected.

Model Selection Process (S8002)

Figure 8B:
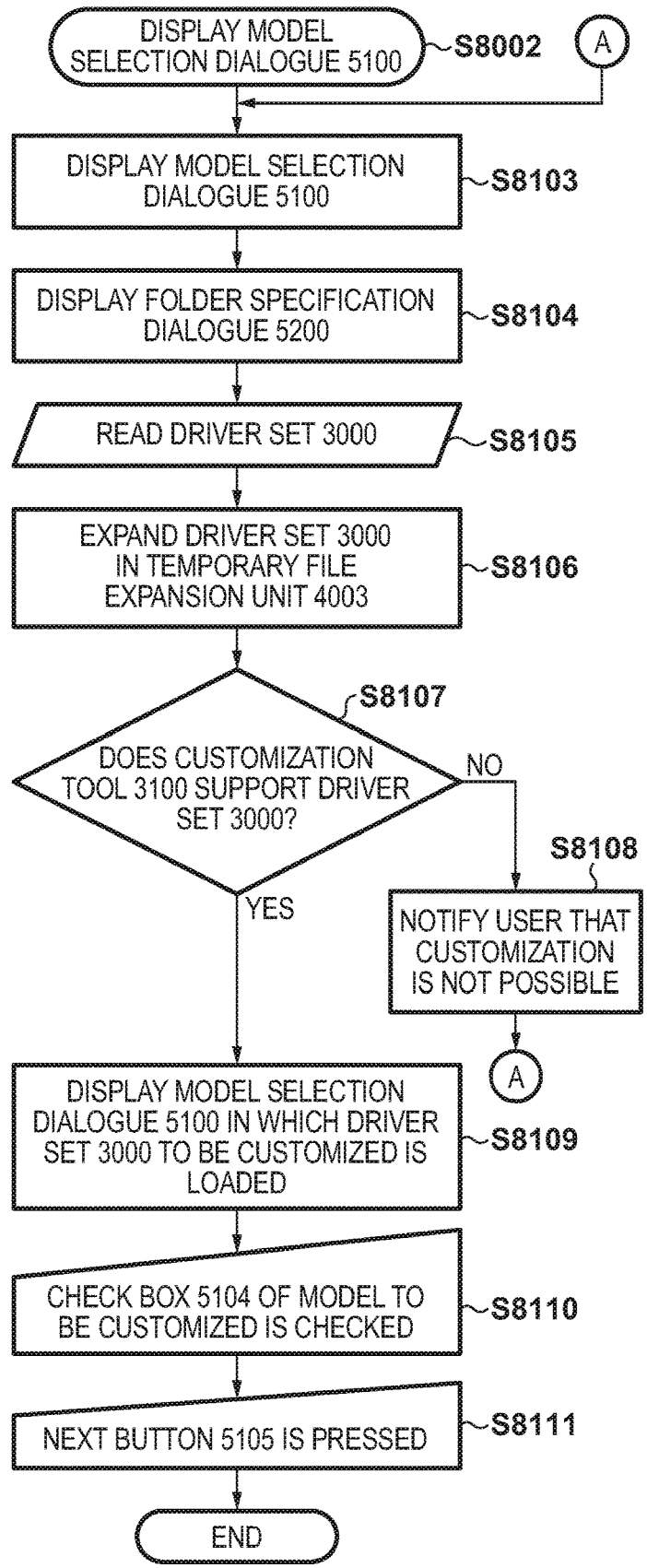
FIG. 8B is a flowchart illustrating customization by the customization tool.

The model selection process of step S8002 in FIG. 8A will be described in detail next with reference to FIG. 8B. First, the execution module 3101 displays the model selection dialog 5100 for the subject of the customization, illustrated in FIG. 5B (S8103). The model selection dialog 5100 is a dialog for specifying a folder path for the driver set 3000 on which the customization is based, and selecting a model, of the models corresponding to the driver set 3000, subject to customization.

Upon a browse button 5101 of the model selection dialog 5100 being pressed, the execution module 3101 displays an OS-standard folder specification dialog 5200, illustrated in FIG. 5C (S8104). This dialog is displayed in the display 207, and a folder specification made by a user is received through the dialog.

Upon receiving the specification of a folder by the user through the operation input device 205, the execution module 3101 obtains information of the folder path of the driver set 3000 on which the customization is based. The execution module 3101 reads the driver set 3000 present at the specified folder path (S8105). After being read, the execution module 3101 creates, in the temporary file expansion unit 4003, a unique folder for use by the execution module 3101, and carries out the expansion (S8106). This unique folder is deleted by the execution module 3101 when the execution module 3101 is terminated.

After the expansion in the folder, the execution module 3101 determines whether or not the file corresponds to the customization tool 3100 (S8107). For example, if, upon referring to the information in the INF file 3007, the Version of the driver set 3000 is higher than the version of the corresponding driver set 3000 included in the execution module 3101, the driver set 3000 is determined to not correspond.

In this manner, a confirmation process is carried out on the basis of the configuration of the driver set 3000, the descriptions in the INF file 3007, and the presence/absence of an Export function of the driver UI module 3002. This confirmation process, as well as a decompression process and a backup file copying process carried out when the modules of the driver set 3000 are stored in a compressed state, sometimes take time. Accordingly, a progress dialog 5110 indicating the progress of the process, illustrated in FIG. 5D, is displayed in the model selection dialog 5100 while the processing is underway. If, as a result of confirming the above-described various information, the execution module 3101 has determined that the driver set is not supported, i.e., that customization cannot be carried out, the execution module 3101 notifies the user that customization cannot be carried out (S8108). The model selection dialog 5100 is displayed again after the notification. However, if the execution module 3101 has determined that the driver set 3000 is supported, i.e., that customization can be carried out, the model selection dialog 5100, into which the driver set 3000 subject customization has been loaded (illustrated in FIG. 5E), is displayed (S8109). At this time, the specified folder path is displayed in a text box 5102. The names of models supported by the driver set 3000 in the specified folder path is listed in a list box 5103. The checkbox 5104 is present before each model name in the list box 5103.

Upon the user checking one or more checkboxes 5104 for a model subject to customization in the display model list, a "next" button 5105 becomes operable (S8110). Upon the "next" button 5105 being pressed, the execution module 3101 moves the processing to S8003 (S8111).

Print Settings Customization Process (S8003)

Figure 9A:
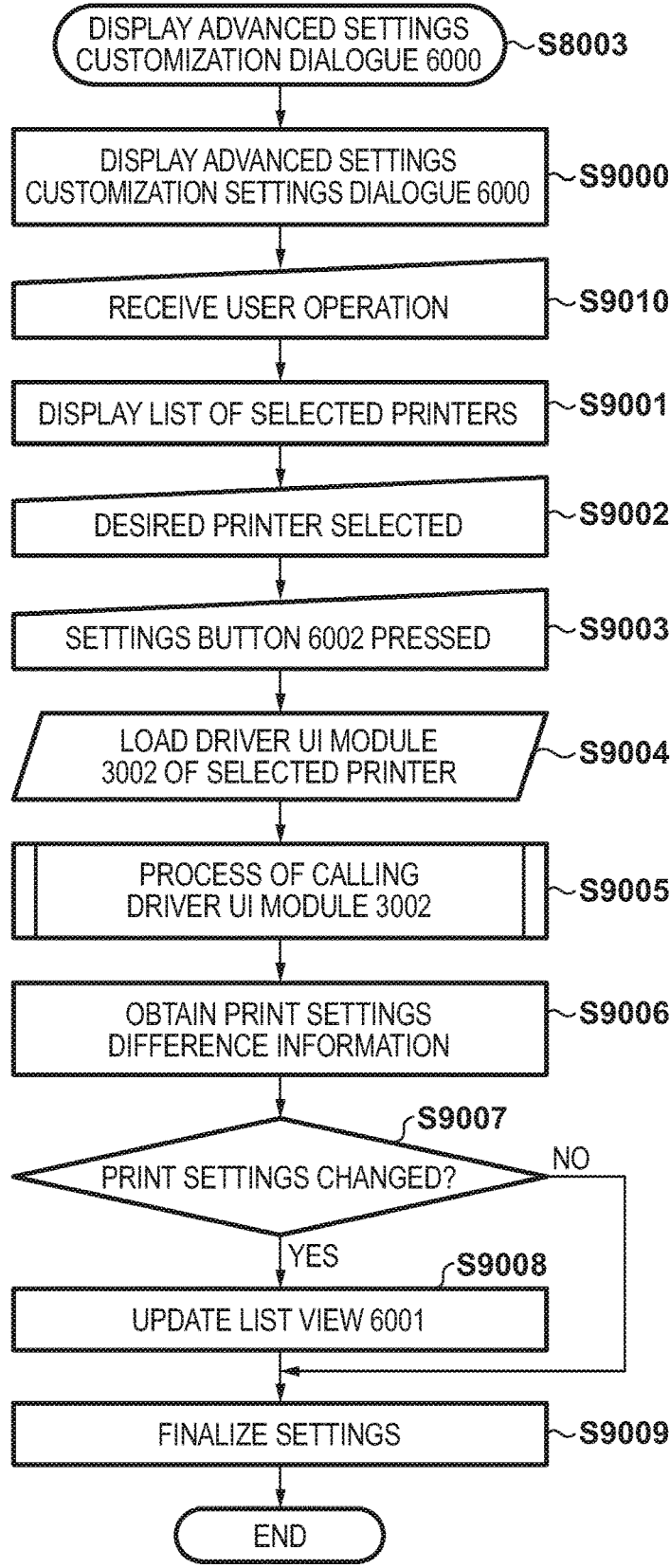
FIG. 9A is a flowchart illustrating the display of an advanced settings customization dialog.
Figure 9B:
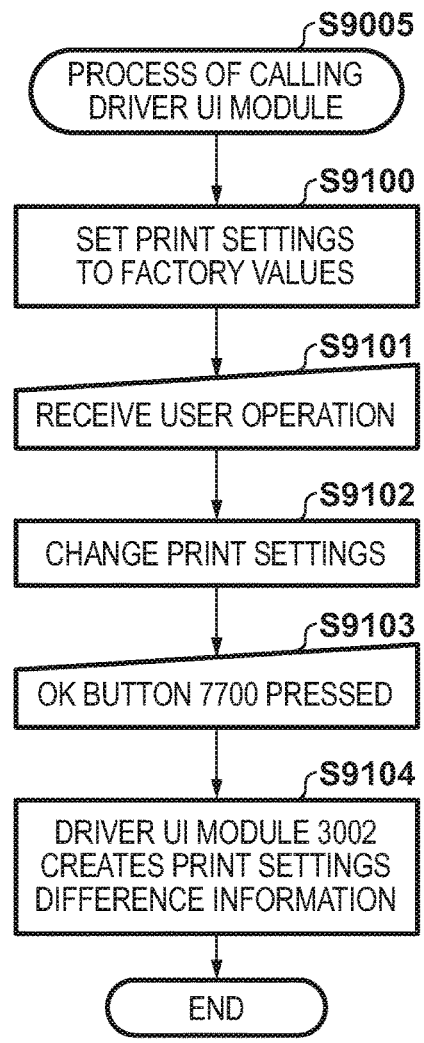
FIG. 9B is a flowchart illustrating the display of the advanced settings customization dialog.

Step S8003 will be described in detail next with reference to FIGS. 9A and 9B. In FIG. 9A, first, the execution module 3101 displays the advanced customization settings dialog 6000 illustrated in FIG. 6A (S9000). After the display, operations of that dialog are received (S9010). The advanced customization settings dialog 6000 includes a list view 6001 displaying a model group designated for customization, and displays a list of models specified in the model selection dialog 5100 (S9001). In the list view 6001, a single model is selected, and the model that is selected can be changed through the operation input device 205 (S9002). The list view 6001 also illustrates the information of the customization state of the print settings, favorites, stamps, device settings, and administrator settings. If the item in question has been customized, text reading "yes" is displayed. The pressing of a settings button 6002 is received in a state where one of the models is selected in the list view 6001 (S9003). After the button has been pressed, the driver UI module 3002 of the selected model, illustrated in FIG. 7A, is loaded in order to carry out the customization (S9004). After the module has been loaded, the print settings UI 7000 is displayed by being called using the pseudo API module 3102, which is an OS 210 process emulator (S9005). In step S9005, the driver UI module is called and the initial print settings are changed, and the driver UI module passes the changed custom print settings data to the execution module 3101. Details of step S9005 will be described with reference to FIG. 9B.

The execution module 3101 obtains the custom print settings data 30084 along with the custom stamp data 30085, the custom stamp list 30089, the custom QPB data 30086, the custom favorites data 30087, and the custom favorites list 30088 (S9006).

It is then confirmed whether the print settings and other settings have been changed (S9007). If the confirmation indicates that the settings have been changed, the execution module 3101 updates the list view 6001 (S9008). The settings are then finalized by pressing a "next" button 6003 (S9009).

Here, the details of step S9005, i.e., the creation of the customized settings file 3008 and particularly the custom print settings data 30084 by the driver UI module 3002, will be described with reference to FIGS. 7A to 7C, 9B, and 18A to 18C. Unless otherwise specified, the subject of these flowcharts is the driver UI module 3002, and the user interface for changing settings is the print settings UI 7000. The applications and modules are stored in the external memory 209, loaded in the RAM 202 as necessary, and executed by the CPU 201 of the client computer 101.

The driver UI module 3002 carries out a response to operations made in the print settings UI 7000 and a process for generating the print settings. The print settings UI 7000 uses the driver UI module 3002 included in the driver set 3000, and thus the print settings can be made with the same operational feel as when normally making print settings through the application 212.

In step S9005, when the driver UI module 3002 is launched and the print settings UI 7000 is displayed, the factory information of the print settings, such as the print settings, favorites, stamps, device settings, and administrator settings, is obtained from the device-dependent files 3001. The obtained print settings are displayed by the print settings UI 7000 (S9100). "Favorites" is a function for saving a plurality of print settings and enabling the settings to be made simultaneously. "Device settings" are settings for the configuration of a finisher or the like of the device, and "administrator settings" is a function for carrying out authentication and the like. The driver UI module 3002 receives a user operation through the print settings UI 7000 after the UI has been displayed (S9101). Through such operations, the user changes the print settings in the print settings UI 7000, and creates the customized settings file 3008 (S9102). The print settings UI 7000 and the various settings items set through the print settings UI 7000 in step S9102 will be described hereinafter.

Print Settings UI and Various Print Settings

A print settings tab 7001 is a summary of the print settings associated with each of the other tabs. In FIG. 7A, a "general print settings" tab is selected. The general print settings tab is a print settings tab including a collection of the print settings most frequently used by a user, such as the orientation, number of copies, and so on. The print settings can be changed through user operations. A button 7004 is a button for specified "restore print settings to default", and the print settings in all of the tabs are restored to the default print settings upon this button being pressed. A button 7005 is a button for specifying "restore to default", and the print settings in the displayed tab are restored to the default print settings upon this button being pressed. The "restore print settings to default" button 7004 and the "restore to default" button 7005 restore the settings to factory values if the default print settings have not been customized, and restore the settings to the custom defaults if the settings have been customized.

A favorites list box 7002 can display a list of registered favorites for print settings. When registering a favorite, a favorites registration screen 7100, illustrated in FIG. 7B, is displayed upon a favorites registration button 7003 being pressed. A name, an icon, and a comment can be entered in the favorites registration screen 7100, and when an OK button 7700 is pressed after the entry of these items has been received, the current print settings are compared with the factory print settings, and the difference data of the print settings is created. The difference data is created as the custom favorites data 30087 for the favorites, and the custom favorites list 30088 is then created. Note that if factory favorites are already present, the custom favorites data 30087 and the custom favorites list 30088 are created by merging the factory favorites with the newly-added favorites.

Figure 18A:
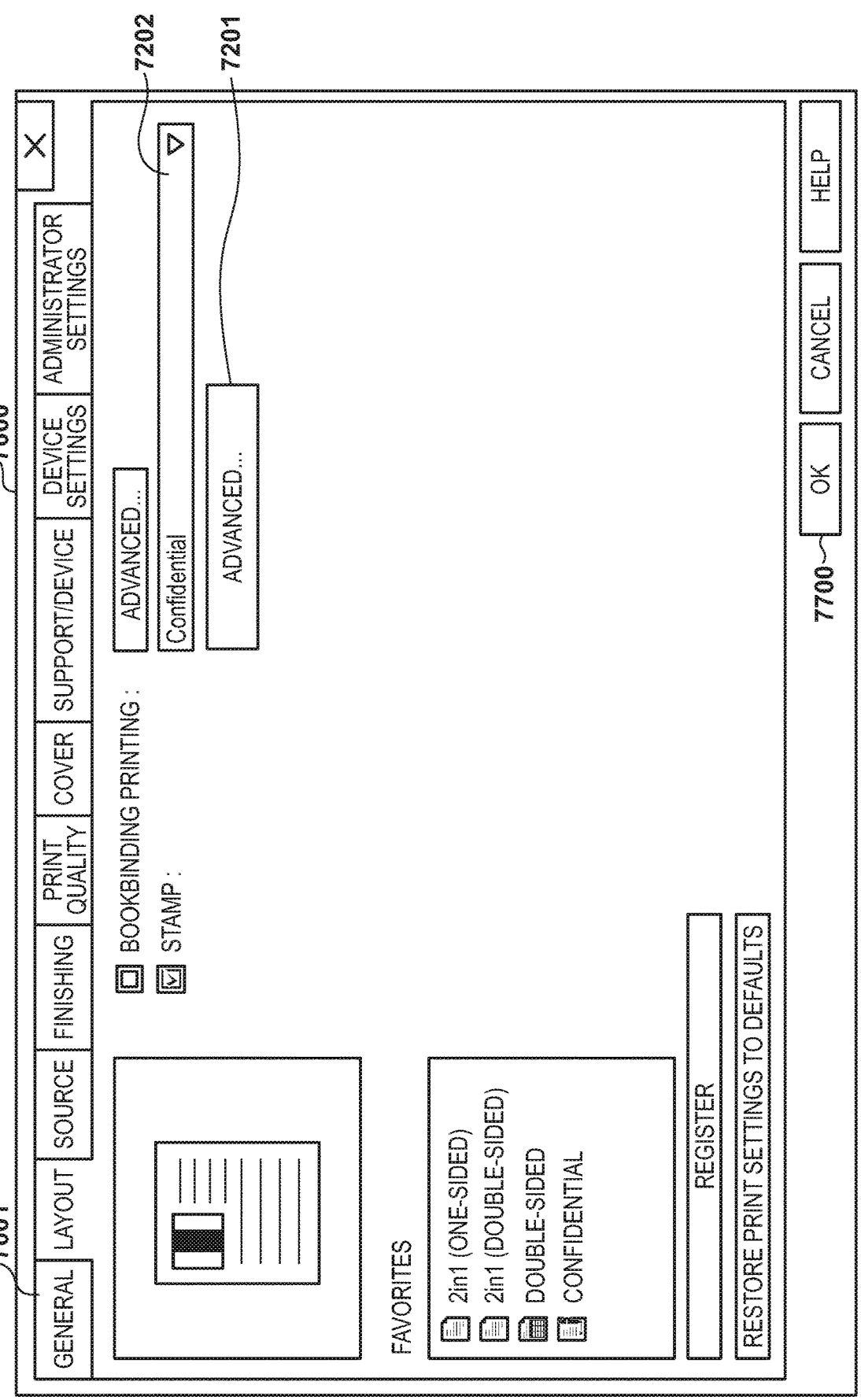
FIG. 18A is a schematic diagram illustrating a print settings UI in which a layout tab is selected.

The creation of the custom stamp list 30089 and the custom stamp data 30085 for the stamps will be described with reference to FIGS. 18A to 18C. FIG. 18A illustrates the print settings UI 7000, in which a layout tab is selected. Items pertaining to the layout are arranged in the layout tab, including functions such as bookbinding, stamps, and so on. A stamp combo box 7202 display stamps with the print settings are applied. A list of registered stamps are displayed as selection options when an event such as a click occurs. A stamp details dialog 7300, illustrated in FIG. 18B, is opened upon receiving an input such as a click or a tap of a stamp details button 7201.

When a stamp list box 7301 is first opened, a list of preset stamps is displayed. Any stamp displayed in the list can be selected in the stamp list box. Stamp preview 7305 displays a preview of the stamp selected in the stamp list box 7301. Settings values of the stamp selected in the stamp list box 7301 are displayed in a stamp settings details text box 7306.

Figure 18C:
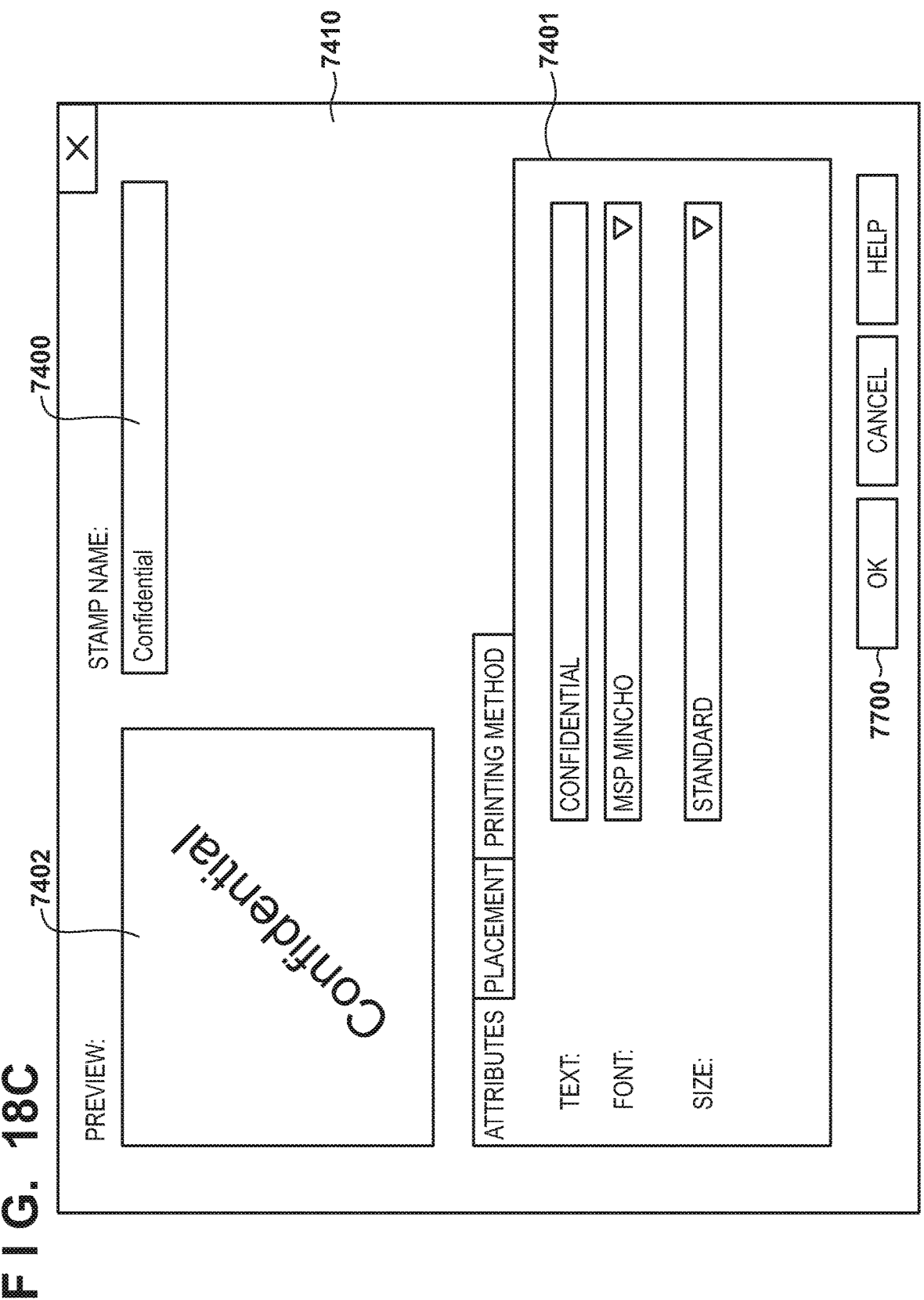
FIG. 18C is a schematic diagram illustrating a stamp editing dialog.

A stamp add button 7302 displays a stamp editing dialog 7410, illustrated in FIG. 18C. A stamp edit button 7303 displays the stamp editing dialog 7410 illustrated in FIG. 18C upon receiving an event such as being clicked. A stamp delete button 7304 can delete a stamp selected in the stamp list box 7301 from the list.

A method for adding and editing a stamp using the stamp editing dialog 7410 illustrated in FIG. 18C will be described next. The stamp editing dialog 7410 includes a stamp name text box 7400, a stamp settings value entry field 7401, and a stamp preview 7402. The stamp settings value entry field 7401 is a text box for entering the name of the current stamp. The name of the stamp selected in the stamp list box 7301 of the stamp details dialog 7300 is displayed. The name of the stamp can be changed through user input. Settings values of the stamp selected in the stamp list box 7301 are displayed in the stamp settings value entry field 7401. The various parameters can be changed through user operations. The stamp preview 7402 displays a preview of the stamp reflecting the settings values in the stamp settings value entry field 7401. When the OK button 7700 is pressed, the values in the stamp name text box and the stamp settings value field are finalized.

Note that if the stamp editing dialog 7410 has been launched from the stamp add button 7302, the stamp for which the values have been finalized is added to the stamp list box 7301, whereas if the stamp editing dialog 7410 has been launched from the stamp edit button 7303, the values of the stamp selected in the stamp list box 7301 are edited. If a stamp has been added, edited, or deleted, the custom stamp data 30085 and the custom stamp list 30089 are created in the customized settings file 3008. Note that if a stamp having factory values is present, the custom stamp data 30085 and the custom stamp list 30089 are created by merging the factory stamps with the newly-added stamps.

The creation of the custom QPB data 30086 will be described next with reference to FIG. 7C. FIG. 7C illustrates a device settings tab. The device settings tab includes a collection of settings pertaining to the device. A device list box 7501 displays a list of the device settings. A single desired item can be selected from the device list box 7501. A settings value change combo box 7502 enables the settings value of the items selected in the device settings list to be changed. Upon being touched, a list of settings values that can be set is displayed, and the settings can be changed by selecting a desired selection option. The same applies for the administrator settings tab and the device settings tab, and thus descriptions thereof will be omitted.

The print settings can be changed in this manner in step S9002. After the processing, i.e., the changing of the print settings, is complete, the OK button 7700 is pressed (S9103). After the OK button 7700 has been pressed, differences between the factory print settings and the currently-set print settings are compared, different items (e.g. Feature elements) are extracted as customized settings items, and the custom print settings data 30084 of the selected model is created (S9104). After the creation, the driver UI module 3002 passes the custom print settings data 30084 to the execution module 3101 along with the custom stamp data 30085, the custom stamp list 30089, the custom QPB data 30086, the custom favorites data 30087, and the custom favorites list 30088. A right to execute the process is then passed to the execution module 3101. In this example, it is assumed that no data aside from the print settings data is set at the factory, and thus only the custom print settings data 30084 saves the differences. However, the configuration is not limited thereto, and differences from the factory data may be saved as various types of custom data for the other data described above, aside from the custom print settings data 30084.

The differences from the factory print settings can be saved as the custom print settings data on the basis of the factory print settings through the procedure described above. The saved custom print settings data is used as the default print settings data when installing the printer driver.

Installation of Customized Driver Set

Installation of the customized driver set will be described with reference to FIGS. 14A, 10A to 10D, and 11A to 11C.

Figure 10B:
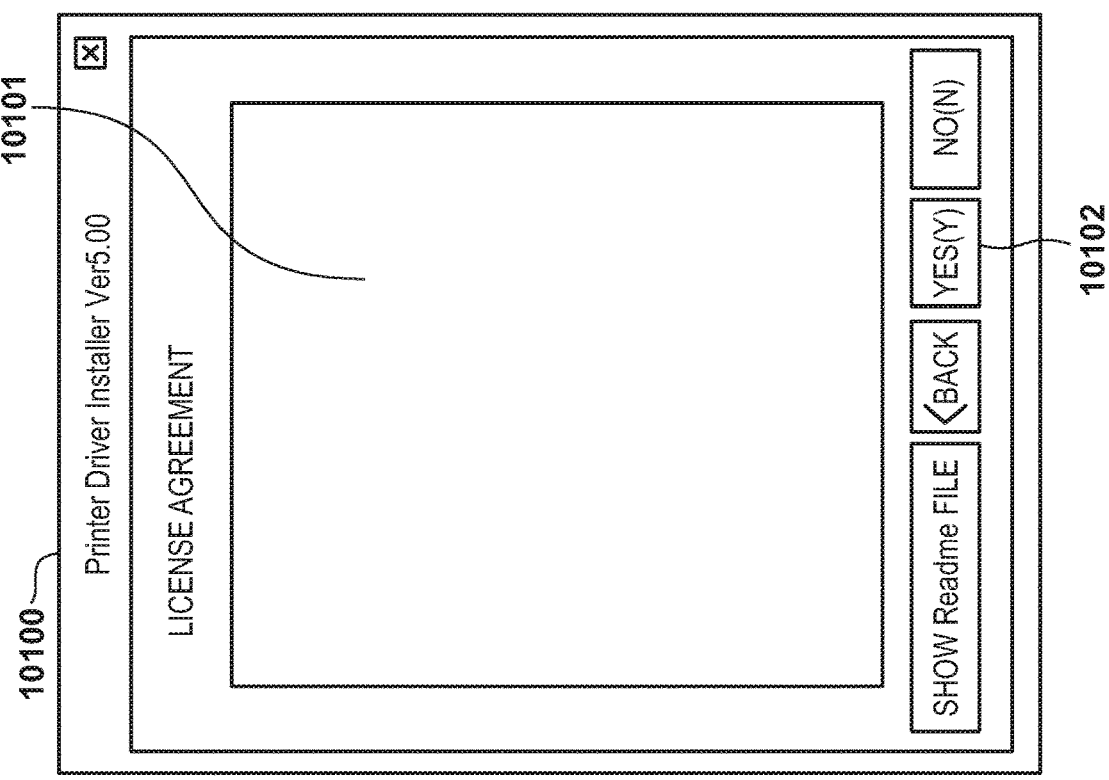
FIG. 10B is a diagram illustrating the installer settings screen.
Figure 10A:
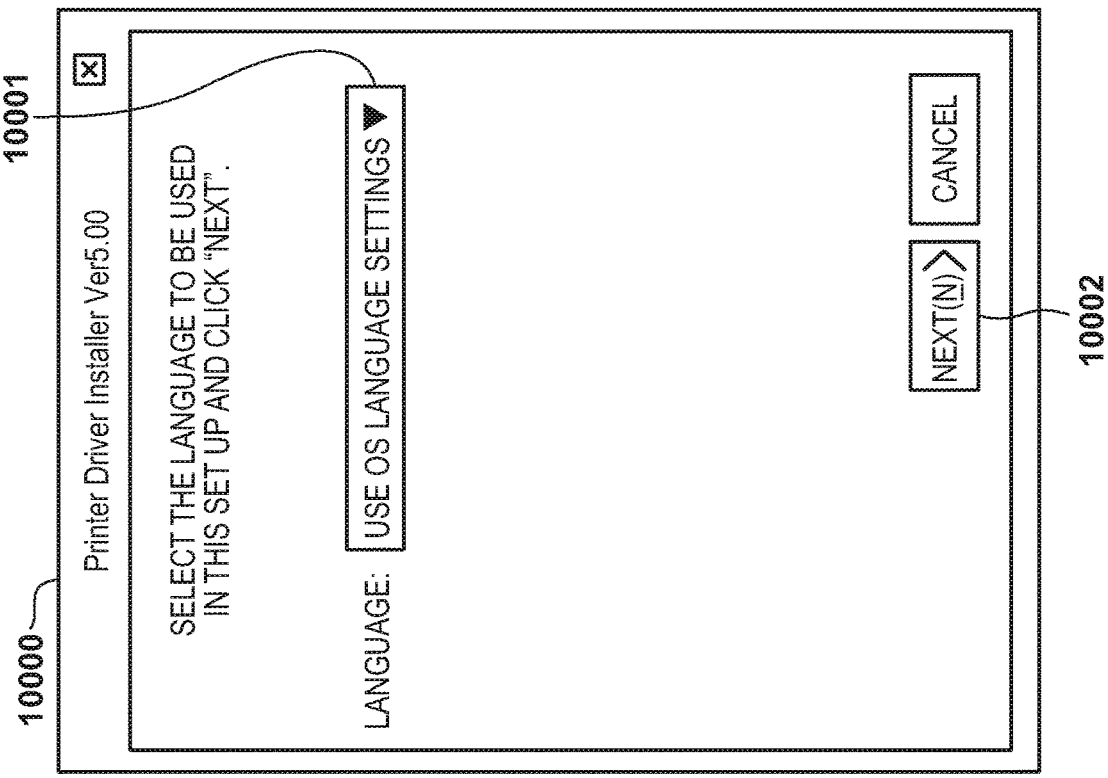
FIG. 10A is a diagram illustrating an installer settings screen.
Figure 14A:
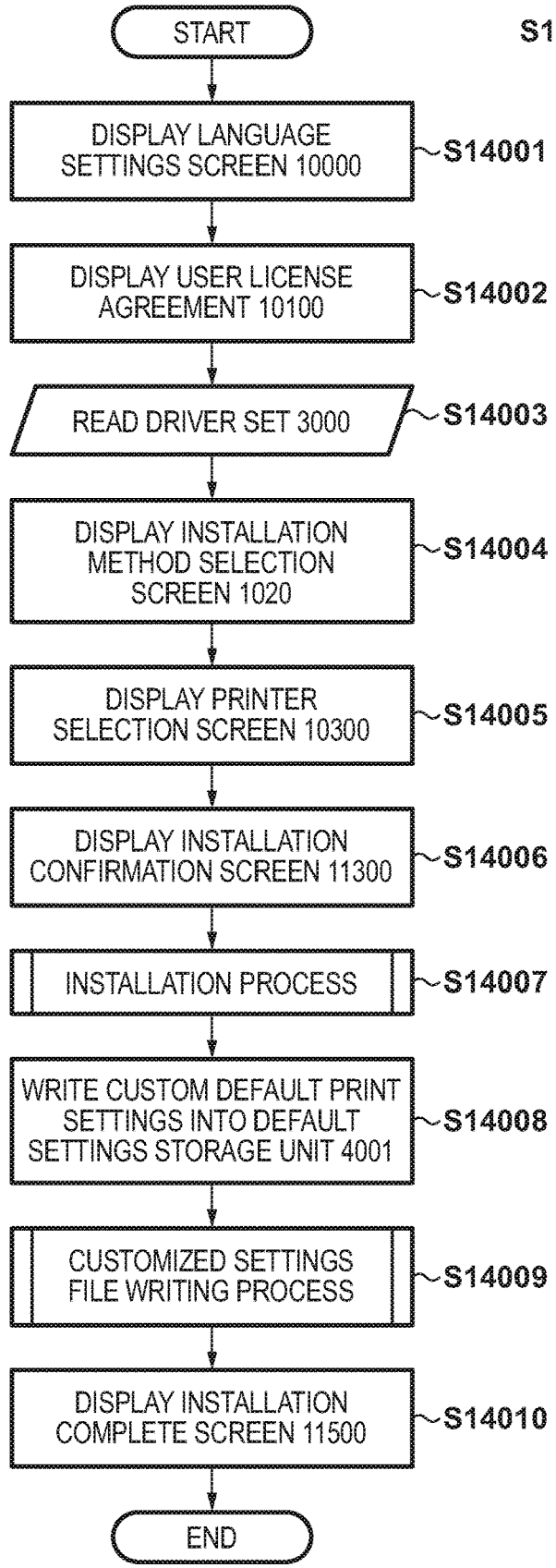
FIG. 14A is a flowchart illustrating the installation of a customized driver.

Unless otherwise specified, the subject is the installer 3004 that installs the driver. The processing illustrated in FIG. 14A is started up on the installer 3004 being launched. The installer 3004 displays a language settings screen 10000, illustrated in FIG. 10A (S14001). After the language settings screen has been displayed, an operation from a user is received through the operation input device 205. After the operation has been received, and language settings 10001 have been changed, the display language switches to the selected language when the next desired screen is displayed. When a "next" button 10002 is then operated by the user through the operation input device 205, a license agreement screen 10100, illustrated in FIG. 10B, is displayed (S14002). The license agreement screen 10100 displays a license agreement 10101.

When a "next" button 10102 is operated in the license agreement screen 10100, the files in the driver set 3000 are read (S14003). After the files are read, the installer 3004 displays an installation method selection screen 10200, illustrated in FIG. 10C (S14004). A plurality of installation methods can be selected in the installation method selection screen 10200. Standard setup installation 10201 is a method of searching for a device connected to a network and carrying out the installation. Custom setup installation 10202 is a method of executing the installation when there is no device. USB connection setup installation 10203 is a method of connecting a device over USB during installation, whereupon the OS 210 uses plug-and-play to search for a driver 3006 matching the hardware ID (HWID) of the device and then carries out the installation. This example will describe the standard setup installation, which is a typical type of installation.

Figure 11A:
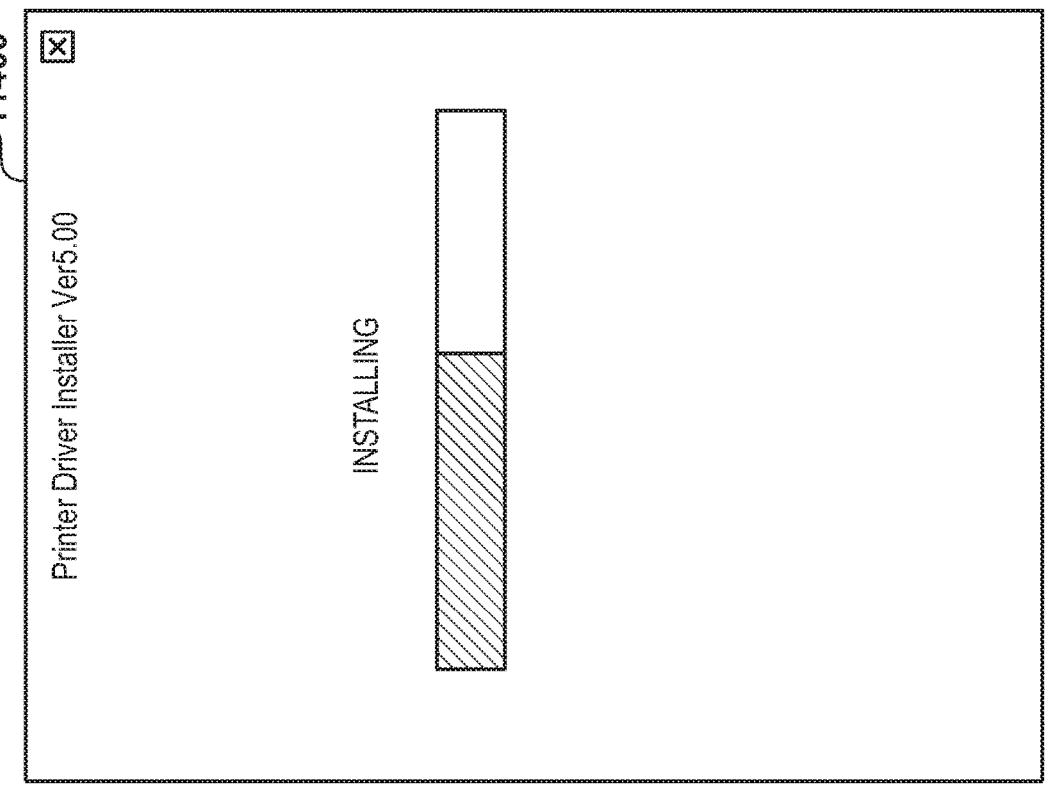
FIG. 11A is a diagram illustrating an installer UI.
Figure 11B:
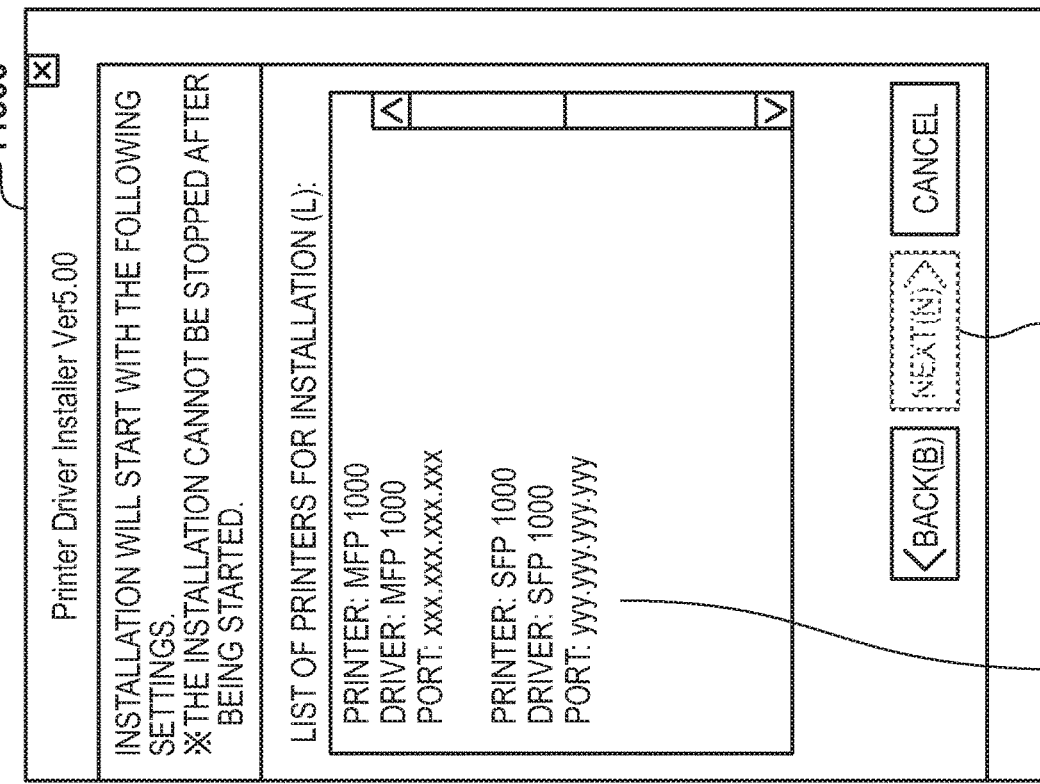
FIG. 11B is a diagram illustrating an installer UI.

Upon receiving the operation of a "next" button 10204 while the standard setup is selected, the installer 3004 searches for printers 102 connected to the network 103, and displays a list of the printers 102 in a printer selection screen 10300, illustrated in FIG. 10D (S14005). The printer selection screen 10300 illustrated in FIG. 10D displays a list of the printers in a printer list box 10301, and a device name, a product name, an IP address, and a MAC address are displayed as items in the printer list box 10301. Immediately after the display, a next button 10303 is grayed out, and the items have checkboxes; when the user makes a selection by operating the operation input device 205, a check is inserted in the checkbox. When a check is inserted, the next button 10303 is no longer grayed out, and becomes active. When the next button is selected by the user, an installation confirmation screen 11300, illustrated in FIG. 11A, is displayed (S14006).

Figure 11C:
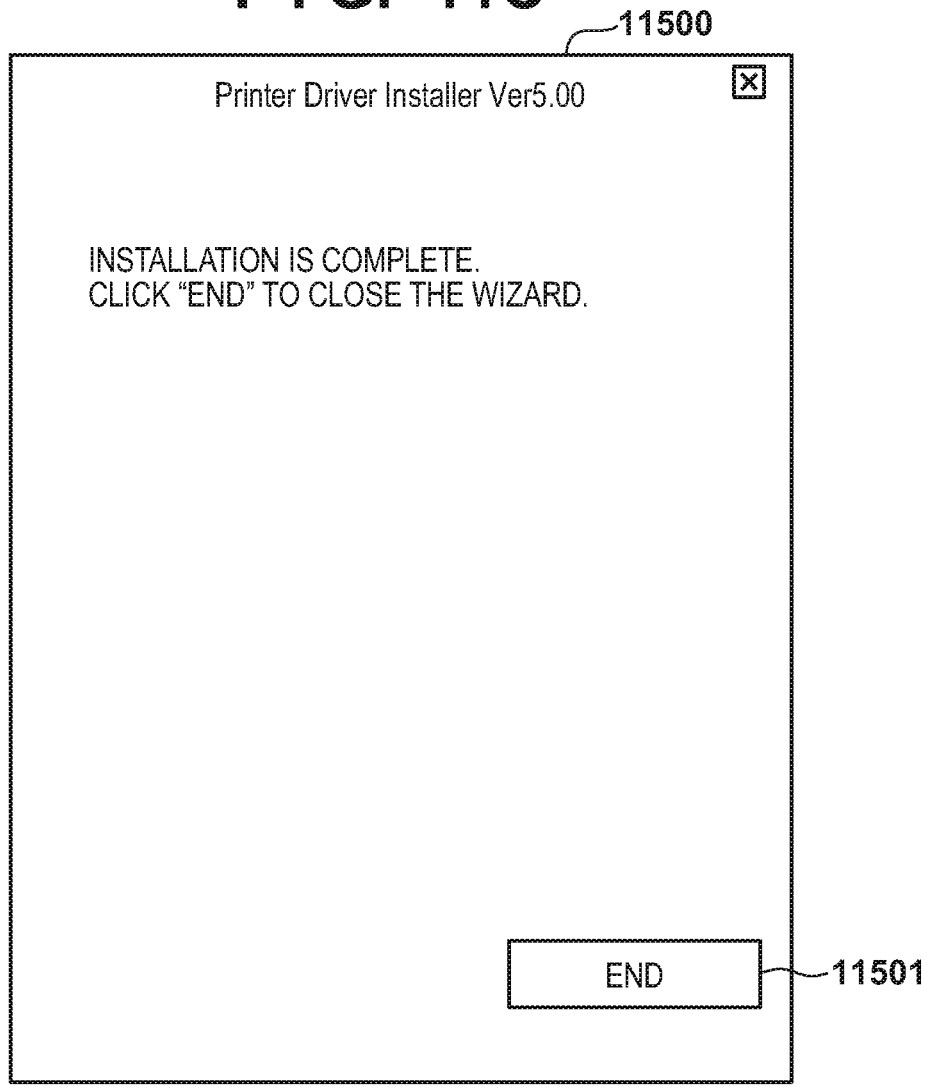
FIG. 11C is a diagram illustrating an installer UI.

The installation confirmation screen 11300 displays a printer name, a driver name, and a port for the driver 3006 to be installed, as indicated by 11301. Because this is a standard installation, the port is the IP address of the printer. Upon a next button 11302 being pressed in the installation confirmation screen 11300, the installer 3004 internally creates an installation target list, and starts the installation process after displaying a progress screen 11400, illustrated in FIG. 11B (S14007). The installation process will be described later with reference to FIG. 14B. After the installation process, the user default print settings are written into the default settings storage unit 4001 (S14008). The customized settings file writing process is then carried out (S14009). The customized settings file writing process will be described later with reference to FIG. 15. After the customized settings file writing process is complete, a customized driver set installation end screen 11500, illustrated in FIG. 11C, is displayed, and the process is completed upon an end button 11501 being pressed (S14010).

Installation Process

Figure 14B:
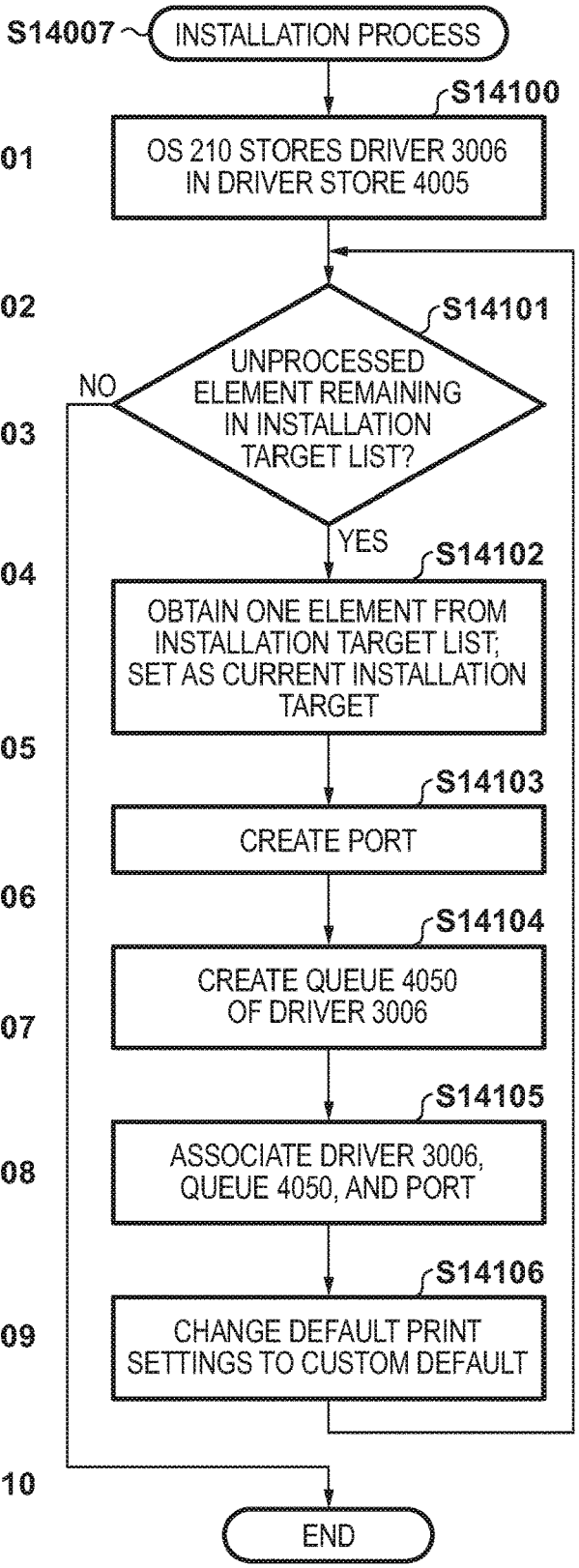
FIG. 14B is a flowchart illustrating the installation of a customized driver.

The process of installing the driver 3006 to be installed will be described with reference to the flowchart in FIG. 14B. Unless otherwise specified, the subject of this flowchart is the installer 3004. The applications and modules are stored in the external memory 209, loaded in the RAM 202 as necessary, and executed by the CPU 201 of the client computer 101.

First, the driver 3006 is stored in the driver store 4005, which is a predetermined folder managed by the OS 210 (S14100). The storage process is executed by the installer 3004 using a function of the OS 210.

In the loop from S14101 to S14106, the installer 3004 carries out the process for the driver 3006 for the individual printers 102 in the installation target list. First, it is confirmed whether there is an unprocessed printer 102 in the installation target list (S14101). If the confirmation indicates that there is an unprocessed printer 102 in the installation target list, one driver 3006 is obtained for the unprocessed printer 102 and taken as the current installation target (S14102). A request is made to the OS 210 on the basis of information such as the IP address of the current installation target, and a port is created in the OS 210 (S14103). Next, a request is made to the OS 210 for a queue 4050 for managing print jobs for the driver 3006, and the queue 4050 is created (S14104). The queue information storage unit 4002 is created at this time. Finally, a request is made to the OS 210 to associate the driver 3006 with the queue 4050 and the port (S14105). After the installation process, the default print settings are changed to the custom default using the OS API 4004 (S14106). The "custom default" may be settings in which the factory settings reflect the custom print settings data 30084 for each device, changed and saved through the procedure illustrated in FIG. 8A. The installation process ends if all the devices in the installation target list have been processed.

Customized Settings File Writing Process

Figure 15:
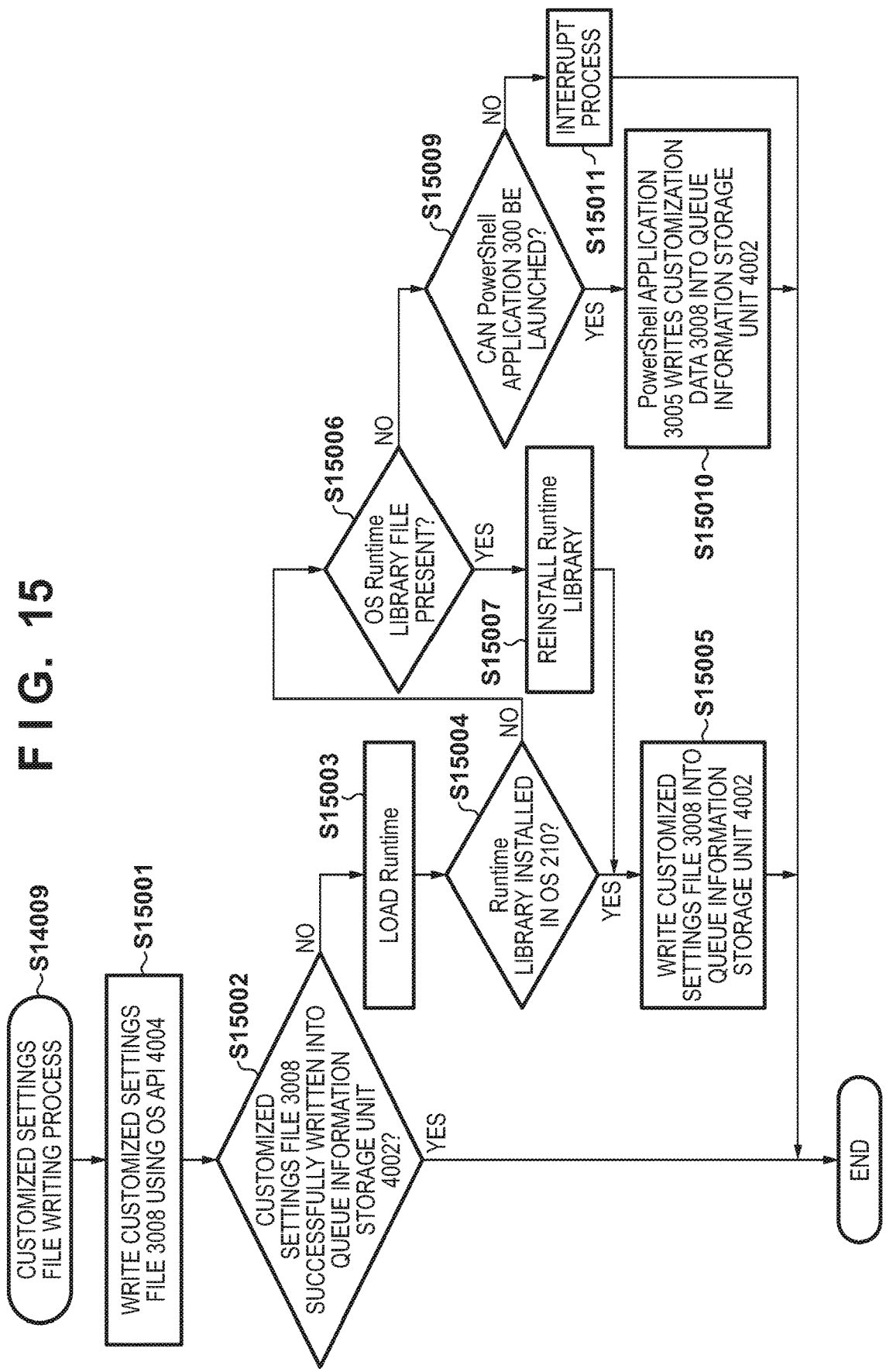
FIG. 15 is a flowchart illustrating a customized settings file writing process.

The process of writing the customized settings file 3008 will be described next with reference to FIG. 15. Unless otherwise specified, the subject of FIG. 15 is the installer 3004. The applications and modules are stored in the external memory 209, loaded in the RAM 202 as necessary, and executed by the CPU 201 of the client computer 101.

First, the installer 3004 attempts to access the OS API 4004, and writes the customized settings file 3008 into the queue information storage unit 4002 (S15001).

The installer 3004 then confirms whether or not the write has failed (S15002). If the write has failed and an exception has occurred, the installer 3004 moves the process to S15003. In S15003, dynamic loading of the Runtime library is attempted (S15003). In step S15004, it is determined whether the dynamic loading of the Runtime library has succeeded.

If the Runtime library is not installed and the dynamic loading has failed, the process moves to S15006 (S15004— No). The installer 3004 then searches the OS Runtime library storage unit 4008 for an OS Runtime library (S15006). If an OS Runtime library is present in the OS Runtime library storage unit 4008, the OS Runtime library is copied to a current folder of the installer 3004, and the name is set to the same name as the target Runtime library (S15007). After the name has been made the same, and the Runtime library has been dynamically loaded, the customized settings file 3008 is written into the queue information storage unit 4002 (S15005). If, in step S15006, there is no OS Runtime library present, the process moves to S15009. It is confirmed whether the PowerShell application 3005 can be launched from another process (S15009). This confirmation may be made by actually attempting to launch the application. If the launch is successful, the customized settings file 3008 is written into the queue information storage unit 4002 by the PowerShell application 3005 (S15010). On the other hand, if the launching of the PowerShell application 3005 has failed due to insufficient memory or the like, the processing is suspended (S15011).

If, in step S15002, the customized settings file 3008 has been successfully written using the OS API, the process ends there. Additionally, if, in step S15004, the installation of the Runtime library has succeeded, the customized settings file 3008 is written into the queue information storage unit 4002 using the API of the Runtime library.

As described thus far, first, the write is attempted using the OS API, and if that write has failed, the dynamic loading of the Runtime library is attempted. If the loading has succeeded, the customized settings file 3008 is written into the queue information storage unit 4002 using the Runtime library. If the loading of the Runtime library has failed, the Runtime library of the OS is loaded and the user interface uses that Runtime library. If that has failed, the customized settings file 3008 is written into the queue information storage unit 4002 using the PowerShell application 3005. In this manner, the units capable of writing the customized settings file are tried in order from the most efficient unit, and when the write has failed for one unit, the write is attempted with the next unit. This is carried out until the write is successful, and the write should succeed when the PowerShell application 3005 is used. Doing so improves the possibility that the write will succeed. At the same time, the write is carried out as efficiently and quickly as possible.

Processing of Print Settings Application

Figure 16:
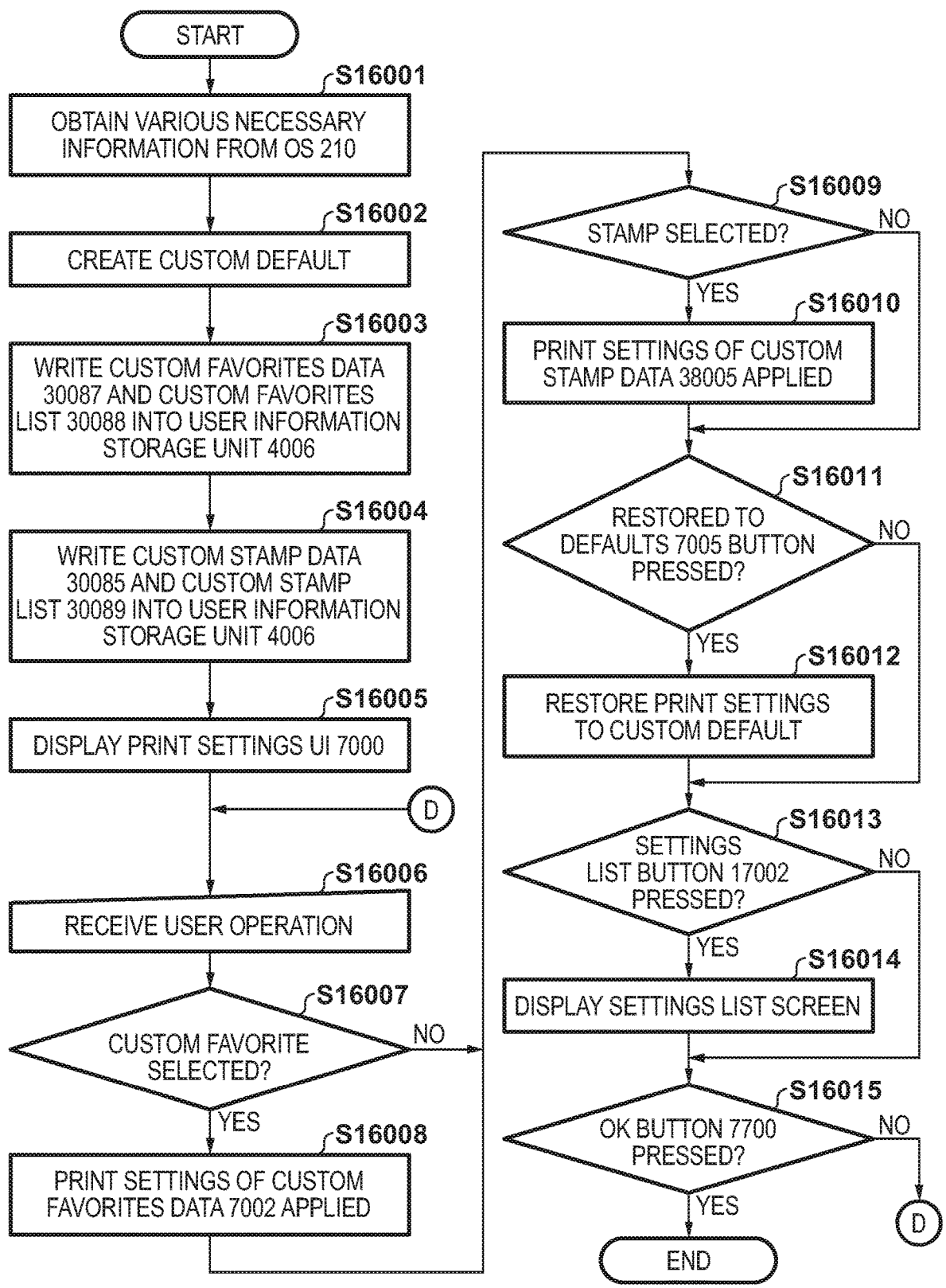
FIG. 16 is a flowchart illustrating the launching of a print settings UI of a customized driver.

The launching of the print settings application 4000 will be described using the flowchart in FIG. 16, and the user interface illustrated in FIGS. 17A and 17B. Unless otherwise specified, the subject of this flowchart is the print settings application 4000. The applications and modules are stored in the external memory 209, loaded in the RAM 202 as necessary, and executed by the CPU 201 of the client computer 101.

As described with reference to FIG. 4, the print settings application 4000 obtains various types of necessary information, including the customized settings file 3008 (S16001). The customized settings file 3008 can be obtained from the queue information storage unit 4002, for example, and includes the custom print settings data 30084, the custom stamp data 30085, and so on for each printer installed, as illustrated in FIG. 3B. After this obtainment, the custom print settings data 30084 is applied to the factory print settings, and the custom default is created (S16002). The factory print settings can be obtained from the device-dependent files 3001, for example. The created custom default may be saved in the RAM 202, the external memory 209, or the like, for example.

Next, the custom favorites data 30087 is written into the user information storage unit 4006 (S16003). After this writing, the custom stamp data 30085 is written into the user information storage unit 4006 (S16004). After this writing, the driver UI module 3002, illustrated in FIG. 5A, is loaded using various types of information and is launched, which displays the print settings UI 7000 (S16005). After the display, a user operation is received (S16006). The steps from step S16006 on are processes carried out by the driver UI module 3002.

Here, a list of the values entered in the Name element of the custom favorites list 30088 is displayed in the favorites list box 7002 of the print settings UI 7000. If this display is to be carried out, the displayed items are sorted by the Index attribute described with reference to FIGS. 13A to 13D.

A case where one of the custom favorites in the data in the favorites list box 7002 has been selected will be described (S16007). The print settings application 4000 applies the print settings in the data of the custom favorites data 30087 having a matching ID attribute to the selected favorite (S16008).

For stamps, too, the custom stamp list 30089 is displayed the stamp combo box indicated by 7202, sorted by the Index attribute described with reference to FIGS. 13A to 13D. A case where a custom stamp is selected in the stamp combo box 7202 after the display will be described (S16009). The print settings application 4000 applies the data of the custom stamp data 30085 having a matching ID attribute to the print settings in response to a selection made through the operation input device 205 (S16010).

Here, a case where the button 7005 for restoring the standard standings has been pressed will be described (S16011). When the button 7005 for restoring the standard settings has been pressed, the print settings in the display tab are restored to the custom default print settings (S16012).

FIG. 17A illustrates a support tab of the print settings application 4000. A case where a settings list button 17002 has been pressed in this tab will be described (S16013). If the settings list button 17002 has been pressed, a settings list dialogue 17100, illustrated in FIG. 17B, is displayed (S16014). The settings list dialogue 17100 is a dialogue in which a list of the currently-set print settings is displayed, and in the case of a normal driver, differences between the factory print settings in the current print settings are indicated by bold text. On the other hand, in the case of a customized driver, differences between the custom default in the current print settings are indicated by bold text, as indicated by 17101. The differences are items saved in the custom print settings data 30084, and thus the items saved in the custom print settings data 30084 may be indicated by bold text.

If the OK button 7700 has been pressed through user operations, the driver UI module 3002 closes and terminates the print settings UI 7000, and the print settings application 4000 is also terminated (S16015).

Note that the print settings may be changed, and the changed print settings may be saved, in the print settings UI 7000. The changed print settings, i.e., the differences from the factory print settings, are reflected in the customized settings file 3008 and stored in the queue information storage unit 4002. Through the procedure described above, the print settings can be displayed and changed through the print settings application 4000 as well.

If at the time of printing, for example, a new printer to be used is selected, the factory print settings of the selected printer are obtained from the device-dependent files 3001, for example. Furthermore, the custom print settings data 30084 is obtained from the queue information storage unit 4002, and is reflected in the factory print settings. These thus become the custom default print settings. The user can make further changes to the settings on the basis of these custom default print settings. The custom default print settings are saved in association with the selected printer, and continue to be held as long as that printer is selected, for example. If another printer has been selected, the custom default print settings are reconfigured and held as described above for the driver of that printer.

As described thus far, custom default print settings customized on the basis of the factory default print settings (also called simply "default print settings") are stored in the queue information storage unit 4002 as differences from the default print settings. Accordingly, the size of the print settings data can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-123567, filed Jun. 23, 2017 which is hereby incorporated by reference herein in its entirety.

What is claimed is:

1. An information processing apparatus comprising:
   a display unit that displays a print settings screen corresponding to a selected printer; and
   a controller including a processor and a memory, the controller configured to function as:
      a receiving unit that receives one or more print settings through the print settings screen;
      a writing unit that, on the basis of the received one or more print settings, writes information indicating the one or more print settings to a storage by calling a first API; and
      a determining unit that determines whether the information is written to the storage successfully,
   wherein, based on determining that the information is not successfully written to the storage by calling the first API, the writing unit writes the information to the storage by calling a second API different from the first API.

2. The information processing apparatus according to claim 1, wherein the print settings include a setting value for each of functions, a stamp, and a combination of individual user settings.

3. The information processing apparatus according to claim 1, the controller further function as a selecting unit that selects a printer.

4. The information processing apparatus according to claim 1,
   wherein the display unit displays print settings in each of tabs; and
   when the receiving unit receives an instruction to restore a tab to a default, the receiving unit restores print settings included in that tab to the default print settings, and when the receiving unit receives an instruction to restore all of the print settings to defaults, the receiving unit restores all of the print settings to the default print settings.

5. The information processing apparatus according to claim 1, further comprising:
   an installing unit that installs a printer driver and the print settings corresponding to the selected printer in an operating system of the information processing apparatus,
   wherein the installing unit installs the one or more print settings as the print settings.

6. The information processing apparatus according to claim 5, wherein the installing unit attempts to install the one or more print settings in the operating system using a plurality of methods in order.

7. The information processing apparatus according to claim 6, wherein the installing unit attempts to install the one or more print settings using an OS API, a runtime library, an OS runtime library, and a PowerShell API as the plurality of methods in that order until the installation succeeds.

8. The information processing apparatus according to claim 1, wherein the first API and the second API are both provided by an Operation system, and the second API is an API in Runtime Library.

9. A driver customizing method of an information processing apparatus, the method comprising:
   displaying a print settings screen corresponding to a selected printer;
   receiving one or more print settings through the print settings screen;
   writing, on the basis of the received one or more print settings, information indicating the one or more print settings to a storage by calling a first API; and
   determining whether the information is written to the storage successfully,
   wherein based on determining that the information is not successfully written to the storage by calling the first API, writing the information to the storage by calling a second API different from the first API.

10. The driver customizing method according to claim 9, wherein the one or more print settings include a setting value for each of functions, a stamp, and a combination of individual user settings.

11. The driver customizing method according to claim 9, further comprising selecting a printer.

12. The driver customizing method according to claim 9,
   wherein the displaying displays print settings in each of tabs; and
   when the receiving receives an instruction to restore a tab to a default, the receiving restores print settings included in that tab to the default print settings, and when the receiving receives an instruction to restore all of the print settings to defaults, the receiving restores all of the print settings to the default print settings.

13. The driver customizing method according to claim 9, further comprising:
   installing a printer driver and the print settings corresponding to the selected printer in an operating system of the information processing apparatus,
   wherein the installing installs the one or more print settings as the print settings.

14. The driver customizing method according to claim 13, wherein the installing attempts to install the one or more print settings in the operating system using a plurality of methods in order.

15. The driver customizing method according to claim 14, wherein the installing attempts to install the one or more print settings using an OS API, a runtime library, an OS runtime library, and a PowerShell API as the plurality of methods in that order until the installation succeeds.

16. The driver customizing method according to claim 9, wherein the first API and the second API are both provided by an Operation system, and the second API is an API in Runtime Library.

17. A non-transitory computer-readable medium storing a program that when executed by a computer causes the computer to perform:
   displaying a print settings screen corresponding to a selected printer;
   receiving one or more print settings through the print settings screen;
   writing, on the basis of the received one or more print settings, information indicating the one or more print settings to a storage by calling a first API; and
   determining whether the information is written to the storage successfully, wherein, based on determining that the information is not successfully written to the storage by calling the first API, writing the information to the storage by calling a second API different from the first API.

18. The non-transitory computer-readable medium according to claim 17, wherein the first API and the second API are both provided by an Operation system, and the second API is an API in Runtime Library.

* * * * *